United States Patent
Hatton et al.

(10) Patent No.: US 12,434,966 B2
(45) Date of Patent: Oct. 7, 2025

(54) SORBENT-ENHANCED PROCESSES FOR THE REACTION OF FUEL TO PRODUCE HYDROGEN AND RELATED SYSTEMS

(71) Applicant: Massachusetts Institute of Technology, Cambridge, MA (US)

(72) Inventors: Trevor Alan Hatton, Sudbury, MA (US); Takuya Harada, Nagoya (JP); Cameron G. Halliday, Wokingham (GB)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/642,429

(22) Filed: Apr. 22, 2024

(65) Prior Publication Data

US 2024/0343566 A1 Oct. 17, 2024

Related U.S. Application Data

(63) Continuation of application No. 17/090,235, filed on Nov. 5, 2020, now Pat. No. 11,999,620.
(Continued)

(51) Int. Cl.
*C01B 3/48* (2006.01)
*B01D 53/62* (2006.01)
(Continued)

(52) U.S. Cl.
CPC ............... *C01B 3/48* (2013.01); *B01D 53/62* (2013.01); *B01D 53/80* (2013.01); *B01D 53/96* (2013.01);
(Continued)

(58) Field of Classification Search
CPC .. C01B 3/48; C01B 3/384; C01B 3/56; C01B 35/128; C01B 2203/0233;
(Continued)

(56) References Cited

U.S. PATENT DOCUMENTS 3,505,018 A 4/1970 Bawa et al.
3,754,074 A 8/1973 Grantham
(Continued)

FOREIGN PATENT DOCUMENTS

WO WO 2010/104421 A1 9/2010
WO WO 2018/141911 A1 8/2018
(Continued)

OTHER PUBLICATIONS

Harada et al. "Tri-lithium borate (Li3BO3); a new highly regenerable high capacity CO2 adsorbent at intermediate temperature" J. Mater. Chem. A, 2017, 5, 22224-22233 (Year: 2017).*
(Continued)

*Primary Examiner* — Anthony J Zimmer
*Assistant Examiner* — Syed T Iqbal
(74) *Attorney, Agent, or Firm* — Wolf, Greenfield & Sacks, P.C.

(57) ABSTRACT

Methods of using sorbents to enhance the production of hydrogen from fuel, and related systems, are generally described. In some embodiments, the production of hydrogen from the fuel involves a reforming reaction and/or a gasification reaction combined with a water-gas shift reaction.

20 Claims, 10 Drawing Sheets

Related U.S. Application Data

(60) Provisional application No. 63/005,603, filed on Apr. 6, 2020, provisional application No. 62/932,403, filed on Nov. 7, 2019.

(51) Int. Cl.

| | | |
|---|---|---|
| *B01D 53/80* | (2006.01) | |
| *B01D 53/96* | (2006.01) | |
| *C01B 3/38* | (2006.01) | |
| *C01B 3/56* | (2006.01) | |
| *C01B 35/12* | (2006.01) | |

(52) U.S. Cl.
CPC ............... *C01B 3/384* (2013.01); *C01B 3/56* (2013.01); *C01B 35/128* (2013.01); *B01D 2251/302* (2013.01); *B01D 2251/304* (2013.01); *B01D 2251/60* (2013.01); *B01D 2257/504* (2013.01); *C01B 2203/0233* (2013.01); *C01B 2203/0283* (2013.01); *C01B 2203/0811* (2013.01); *C01B 2203/1241* (2013.01); *C01B 2203/86* (2013.01)

(58) Field of Classification Search
CPC ..... C01B 2203/0283; C01B 2203/0811; C01B 2203/1241; C01B 2203/86; C01B 3/348; C01B 2203/0415; C01B 2203/0475; C01B 3/38; B01D 53/62; B01D 53/80; B01D 53/96; B01D 2251/302; B01D 2251/304; B01D 2251/60; B01D 2257/504; Y02C 20/40; Y02P 20/133; Y02P 30/00

See application file for complete search history.

(56) References Cited

U.S. PATENT DOCUMENTS

| | | | |
|---|---|---|---|
| 4,668,494 | A | 5/1987 | Van Hook |
| 11,999,620 | B2 | 6/2024 | Hatton et al. |
| 2009/0049748 | A1* | 2/2009 | Day ............................ C10J 3/48 48/77 |
| 2011/0089377 | A1 | 4/2011 | Bingham et al. |
| 2012/0028145 | A1 | 2/2012 | Boden |
| 2012/0122017 | A1 | 5/2012 | Mills |
| 2012/0177552 | A1* | 7/2012 | Billings .................. C01B 3/382 423/220 |
| 2016/0304344 | A1* | 10/2016 | Liu ........................ B01J 37/08 |

FOREIGN PATENT DOCUMENTS

| | | | |
|---|---|---|---|
| WO | WO 2018/227081 | A1 | 12/2018 |
| WO | WO 2020/072115 | A1 | 4/2020 |

OTHER PUBLICATIONS

International Search Report and Written Opinion for Application No. PCT/US2020/059069 mailed Feb. 22, 2021.
[No Author Listed], Serpentine. CAS#14567-83-0. Retrieved Oct. 4, 2023 from: <https://www.chemicalbook.com/ProductChemicalPropertiesCB8945514_EN.htm>. 2 pages.
Boyd et al., Effects of pressure on the melting and polymorphism of enstatite, $MgSiO_3$. J Geophys Res. May 1964; 69(10): 2101-9.
Davis et al., The melting of forsterite up to 50 kilobars. J Geophys Res Mar. 1964; 69 (6): 1113-6.
Ding et al., Adsorption-enhanced steam-methane reforming. Chem Eng Sci. 2000; 55: 3929-40.
Gu et al., Preparation of refractory materials from ferronickel slag. The Minerals, Metals & Materials Society 201., B. Li et al. (eds.), Characterization of Minerals, Metals, and Materials 2018, The Minerals, Metals & Materials Series.
Harada et al., Molten ionic oxides for $CO_2$ capture at medium to high temperatures. J Mater Chem A. 2019; 7: 21827-34.
Harada et al., Tri-lithium borate (Li3BO3); a new highly regenerable high capacity CO2 adsorbent at intermediate temperature. J Mater Chem A. 2017; 5: 22224-33.
Nemat et al., Possible use of waste serpentine from Abdasht chromite mines into the refractory and ceramic industries. Ceramics Int. 2016; 42: 18479-83.
Richet et al., Anorthite, andesine, wollastonite, diopside, cordierie and pyrope: thermodynamics of melting, glass transitions, and properties of the amorphous phases. Earth Planet Science Lett. 1984: 67: 415-32.
Roeder et al., Olivine-liquid equilibrium. Contr Mi. Petrol. 1970; 29: 275-89.

* cited by examiner

SORBENT-ENHANCED PROCESSES FOR THE REACTION OF FUEL TO PRODUCE HYDROGEN AND RELATED SYSTEMS

RELATED APPLICATIONS

This application is a continuation of U.S. patent application Ser. No. 17/090,235, filed Nov. 5, 2020, and entitled "Sorbent-Enhanced Processes for the Reaction of Fuel to Produce Hydrogen and Related Systems," which claims priority under 35 U.S.C. § 119 (e) to U.S. Provisional Patent Application No. 63/005,603, filed Apr. 6, 2020, and entitled "Sorbent-Enhanced Processes for the Reaction of Fuel to Produce Hydrogen and Related Systems," and to U.S. Provisional Patent Application No. 62/932,403, filed Nov. 7, 2019, and entitled "Method of Steam Methane Reforming in the Presence of Molten Sorbents," each of which is incorporated herein by reference in its entirety for all purposes.

TECHNICAL FIELD

Methods of using sorbents to enhance the production of hydrogen from fuel, and related systems, are generally described.

BACKGROUND

Steam methane reforming is a commercialized technology for the production of hydrogen. Currently deployed systems are often limited in their ability to efficiently recover both high purity hydrogen and high purity carbon dioxide. With societies' growing environmental awareness and the increasing demand for hydrogen, there is a strong commercial interest in overcoming the limitations of current steam methane reforming technologies.

SUMMARY

The use of a sorbent to enhance the production of hydrogen from fuel, and related systems, are generally described. The subject matter of the present invention involves, in some cases, interrelated products, alternative solutions to a particular problem, and/or a plurality of different uses of one or more systems and/or articles.

In one aspect, methods are provided. The method comprises, in some embodiments, reacting a fuel and water to produce hydrogen gas and carbon dioxide; and exposing the carbon dioxide to a sorbent comprising a salt in molten form to capture at least a portion of the carbon dioxide.

In certain embodiments, the method comprises exposing a sorbent comprising a salt in molten form to an environment containing a mixture of gaseous fuel and steam such that at least part of the mixture interacts with the sorbent and reacts to form hydrogen gas.

In some embodiments, the method comprises exposing a sorbent comprising a salt in molten form, to an environment containing a mixture of gaseous fuel and steam such that at least a part of the mixture interacts with the sorbent and reacts to form hydrogen gas; and releasing captured carbon dioxide in the gas phase to a second environment to upconcentrate carbon dioxide and regenerate the sorbent.

In certain embodiments, the method comprises exposing a sorbent comprising a salt in molten form, the sorbent mixed with a catalyst, to an environment containing a mixture of gaseous fuel and steam such that at least part of the mixture interacts with the sorbent and reacts to form hydrogen gas.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
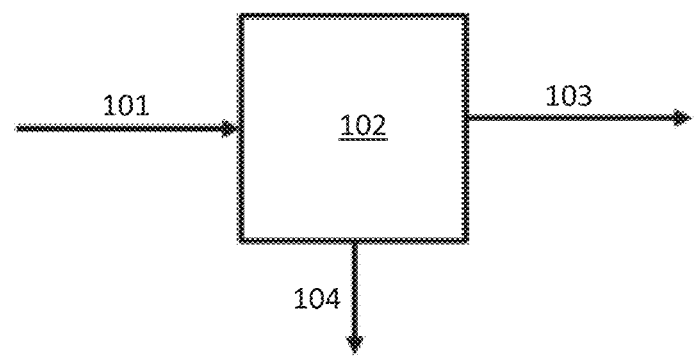
FIG. 1 is a schematic diagram of a system for generating hydrogen from a fuel including a single vessel, according to some embodiments.

The production of hydrogen gas from various starting fuels (e.g., hydrocarbon fuels and the like) may find applications in the energy and chemicals industries, in particular the environmentally responsible production of energy from fossil fuels. Hydrogen gas has several important commercial uses, including its use in the production of ammonia, hydrogenation of fats and oils, and processing of petroleum, as some examples. One process used to generate hydrogen is the water-gas shift reaction (WGSR) governed by the following equilibrium:

Without wishing to be bound by any theory, in this reaction, carbon monoxide is used to reduce water into hydrogen gas, and the hydrogen gas may be harvested for subsequent use. The WGSR process may be coupled to an industrial process in which carbon monoxide is produced (such as the gasification of coal) to generate hydrogen. However, because the WGSR is an equilibrium, it has generally been difficult to isolate a highly concentrated hydrogen gas stream.

However, it has been recognized and appreciated, within the context of the present disclosure, that the addition of a sorbent can pull the equilibrium-limited reforming and water gas shift reactions to completion such that hydrogen (e.g., hydrogen gas) is produced in greater concentrations. Without wishing to be bound by any particular theory, it is believed that the presence of the sorbent can result in the production of hydrogen gas in a single step. In some embodiments, the addition of molten sorbents, (e.g., molten alkali metal borates) to the reactor in which a reforming reaction (e.g., a methane reforming reaction) is carried out and/or to a downstream vessel can pull the overall equilibrium to completion (i.e., toward increased generation of hydrogen). In some cases, the sorbent can operate at high temperatures, and optionally at the high pressures involved in steam methane reforming. In some embodiments, the sorbent can incorporate a catalyst. Without wishing to be bound by any theory, the molten alkali metal borates may allow for efficient hydrogen production in this manner because of their fast reaction kinetics, high capacities for carbon dioxide, and/or excellent cyclic regenerability.

Some embodiments comprise exposing a sorbent to an environment containing a mixture of gaseous fuel and steam and/or to a reaction product between a gaseous fuel and steam. In some embodiments, the sorbent comprises a salt in molten form. In some embodiments, the environment to which the sorbent is exposed comprises $CO_2$, and at least a part of the $CO_2$ interacts with and is captured by the sorbent. The capture of the $CO_2$ by the sorbent can drive a hydrogen-production reaction (e.g., the WGSR described above) toward the production of hydrogen. Driving the hydrogen-production reaction toward the production of hydrogen via the exposure to the sorbent can be accomplished by positioning the sorbent in the vessel in which the hydrogen-production reaction is being performed and/or by positioning the sorbent in a vessel downstream of the vessel in which the hydrogen-production reaction is being performed and recycling a hydrogen-containing stream back to the vessel in which the hydrogen-production reaction is being performed. Examples of these types of operations are described in more detail below.

Certain aspects are related to methods. In some embodiments, the method comprises reacting a fuel and water (e.g., steam) to produce hydrogen gas and carbon dioxide. Some embodiments further comprise exposing the carbon dioxide to a sorbent (e.g., a sorbent comprising a salt in molten form) to capture at least a portion of the carbon dioxide. Exposure of the carbon dioxide to the sorbent can result in capture of the carbon dioxide by the sorbent, which can drive the chemical reaction(s) that produces the hydrogen toward completion, resulting in an increased yield of hydrogen.

The exposure of the carbon dioxide to the sorbent can be accomplished in a number of ways. For example, some embodiments comprise exposing the sorbent (e.g., a sorbent comprising a salt in molten form) to an environment containing a mixture of gaseous fuel and steam such that at least part of the mixture interacts with the sorbent and reacts to form hydrogen gas. The exposure of the carbon dioxide to the sorbent could also be accomplished in other ways. For example, in some embodiments, the gaseous fuel and steam is first reacted in a first vessel to produce carbon dioxide and hydrogen and subsequently, in a second vessel, the carbon dioxide can be exposed to a sorbent.

FIGS. 1-3B are cross-sectional schematic illustrations of systems that can be used to perform methods described herein.

FIG. 1 shows a system in which a single vessel is used to react a fuel to produce hydrogen and capture carbon dioxide. In FIG. 1, input stream 101 is transported to vessel 102. Input stream 101 can comprise a fuel and steam. A variety of fuels can be used, examples of which are provided in more detail below. Vessel 102 can be used to conduct one or more chemical reactions in which the fuel and the steam from stream 101 are reacted to form hydrogen and carbon dioxide. For example, in some embodiments, a steam reforming reaction and a water gas shift reaction occur in vessel 102 to produce hydrogen and carbon dioxide from the fuel and the steam. In some embodiments, vessel 102 contains a sorbent which captures at least a portion of the carbon dioxide generated by the chemical reaction in vessel 102. The capture of the carbon dioxide by the sorbent can drive the chemical reaction equilibrium toward hydrogen generation, increasing the yield of hydrogen from the reaction of the fuel. Optionally, outlet stream 103 can be used to transport hydrogen out of vessel 102. Also, optional outlet stream 104 can be used to transport carbon dioxide out of vessel 102.

Figure 2:
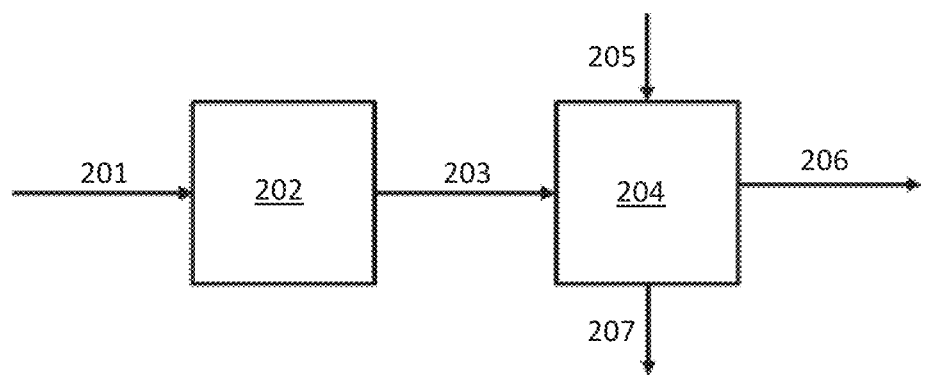
FIG. 2 is a schematic diagram of a system for generating hydrogen from a fuel including two vessels, according to some embodiments.

FIG. 2 shows a system in which multiple vessels are used to react a fuel to produce hydrogen and capture carbon dioxide. In FIG. 2, input stream 201 is transported to first vessel 202. Input stream 201 can comprise a fuel and an oxidant (e.g., steam, oxygen, etc.). First vessel 202 can be used to conduct one or more chemical reactions in which the fuel and an oxidant from stream 201 are reacted to form an intermediate stream 203. Intermediate stream 203 may also, in some embodiments, comprise a fuel. For example, in some embodiments, first vessel 202 can be used to perform a steam reforming reaction to convert a fuel (e.g., a hydrocarbon fuel such as methane, ethane, and the like) to syngas (i.e., CO and $H_2$), and the syngas may be transported out of first vessel 202 via intermediate stream 203. As another example, in some embodiments, first vessel 202 can be used to perform a gasification reaction in which a fuel (e.g., coal, biomass, etc.) and an oxidant (e.g., oxygen, steam, etc.) are reacted to form syngas, and the syngas may be transported out of first vessel 202 via intermediate stream 203.

In some embodiments, intermediate stream 203 is transported to second vessel 204. Second vessel 204 can be used to conduct one or more chemical reactions to convert the fuel in intermediate stream 203 to hydrogen and carbon dioxide. For example, in some embodiments, a water gas shift reaction occurs in vessel 204 to produce hydrogen and carbon dioxide from the fuel in intermediate stream 203 and from steam in stream 205. In some embodiments, second vessel 204 contains a sorbent which captures at least a portion of the carbon dioxide generated by the chemical reaction in second vessel 204. The capture of the carbon dioxide by the sorbent can drive the chemical reaction equilibrium toward hydrogen generation, increasing the yield of hydrogen from the reaction of the fuel. Optionally, outlet stream 206 can be used to transport hydrogen out of second vessel 204. Also, optional outlet stream 207 can be used to transport carbon dioxide out of second vessel 204.

Figure 3A:
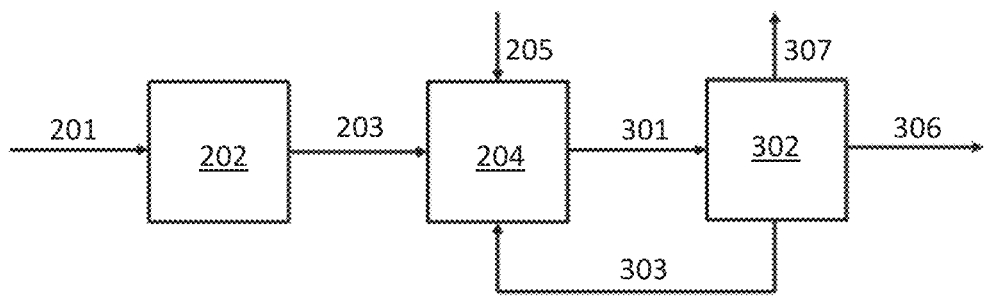
FIGS. 3A-3B show schematic diagrams of systems for generating hydrogen from fuel comprising multiple vessels, according to certain embodiments.

FIG. 3A shows a system in which three vessels are used to react a fuel to produce hydrogen and to capture carbon dioxide. In FIG. 3A, input stream 201 is transported to first vessel 202. Input stream 201 can comprise a fuel and an oxidant (e.g., steam, oxygen, etc.). First vessel 202 can be used to conduct one or more chemical reactions in which the fuel and the oxidant from stream 201 are reacted to form an intermediate stream 203. Intermediate stream 203 may also, in some embodiments, comprise a fuel. For example, in some embodiments, first vessel 202 can be used to perform a steam reforming reaction to convert a fuel (e.g., a hydrocarbon fuel such as methane, ethane, and the like) to syngas (i.e., CO and $H_2$), and the syngas may be transported out of first vessel 202 via intermediate stream 203. As another example, in some embodiments, first vessel 202 can be used to perform a gasification reaction in which a fuel (e.g., coal, biomass, etc.) and an oxidant (e.g., oxygen, steam, etc.) are reacted to form syngas, and the syngas may be transported out of first vessel 202 via intermediate stream 203.

In some embodiments, intermediate stream 203 is transported to second vessel 204. Second vessel 204 can be used to conduct one or more chemical reactions to convert the fuel in intermediate stream 203 to hydrogen and carbon dioxide. For example, in some embodiments, a water gas shift reaction occurs in vessel 204 to produce hydrogen and carbon dioxide from the fuel in intermediate stream 203 and steam in stream 205. In some embodiments, a mixture of hydrogen and carbon dioxide is transported out of second vessel via stream 301 and into third vessel 302.

In some embodiments, third vessel 302 contains a sorbent which captures at least a portion of the carbon dioxide in stream 301 (e.g., generated by the chemical reaction in second vessel 204). The capture of the carbon dioxide by the sorbent can allow one to produce a recycle stream 303 that is enriched in hydrogen relative to stream 301 and depleted in carbon dioxide relative to stream 301. Recycle stream 303 can be transported back to second vessel 204. Transporting a stream enriched in hydrogen and deficient in carbon dioxide back to the second vessel can drive the chemical reaction equilibrium toward hydrogen generation within the second vessel, increasing the yield of hydrogen from the reaction of the fuel. Optionally, in FIG. 3A, outlet stream 306 can be used to transport hydrogen out of third vessel 302. Also, optional outlet stream 307 can be used to transport carbon dioxide out of third vessel 302.

It should be understood that the use of a recycle stream to drive chemical reactions toward the production of hydrogen is not limited to systems in which separate vessels are used to perform multiple reaction steps, and in other embodiments, a single reaction vessel may be used. For example, referring to FIG. 3B, input stream 101 is transported to first vessel 102. Input stream 101 can comprise a fuel and steam. First vessel 102 can be used to conduct one or more chemical reactions in which the fuel and the steam from stream 101 are reacted to form hydrogen and carbon dioxide. For example, in some embodiments, a steam reforming reaction and a water gas shift reaction occur in first vessel 102 to produce hydrogen and carbon dioxide from the fuel and the steam. In some embodiments, hydrogen and carbon dioxide are transported from first vessel 102 to second vessel 302 via stream 301. In some embodiments, second vessel 302 contains a sorbent which captures at least a portion of the carbon dioxide generated by the chemical reaction in vessel 102. The capture of the carbon dioxide by the sorbent can allow one to produce a recycle stream 303 that is enriched in hydrogen relative to stream 301 and depleted in carbon dioxide relative to stream 301. Recycle stream 303 can be transported back to first vessel 102. Transporting a stream enriched in hydrogen and deficient in carbon dioxide back to first vessel 102 can drive the chemical reaction equilibrium toward hydrogen generation within the first vessel, increasing the yield of hydrogen from the reaction of the fuel. Optionally, in FIG. 3B, outlet stream 306 can be used to transport hydrogen out of third vessel 302. Also, optional outlet stream 307 can be used to transport carbon dioxide out of third vessel 302.

As noted above, in certain embodiments, the method comprises reacting a fuel and water (e.g., steam) to produce hydrogen gas and carbon dioxide and exposing the carbon dioxide to a sorbent (e.g., a sorbent comprising a salt in molten form) to capture at least a portion of the carbon dioxide. In some embodiments, the reacting and exposing are conducted in a single vessel. For example, as described above in relation to FIG. 1, the reacting and exposing can both occur within vessel 102. As another example, as described above in relation to FIG. 2, in some embodiments, vessel 204 can be used to both react syngas to produce carbon dioxide and hydrogen as well as capture carbon dioxide. In other embodiments, the reacting is conducted in a first vessel, and the exposing is conducted in a second vessel separate from the first vessel. As another example, as described above in relation to FIG. 3A, a shift reaction (e.g., a water gas shift reaction) can occur in vessel 204 and $CO_2$ and $H_2$ can be transported via stream 304 to vessel 302 where the $CO_2$ and $H_2$ can be exposed to a sorbent within vessel 302.

As noted above, in some embodiments, an inlet stream containing hydrogen gas and carbon dioxide is transported from a first vessel to a second vessel, and the method further comprises recycling a recycle stream, from the second vessel to the first vessel, wherein the recycle stream is enriched in hydrogen relative to the inlet stream and depleted in carbon dioxide relative to the inlet stream. For example, as described above in relation to FIG. 3A, hydrogen gas and carbon dioxide can be transferred from vessel 204 via stream 301 to vessel 302. A sorbent (e.g., a sorbent in molten form) can be contained in vessel 302 and the sorbent can capture at least some of the carbon dioxide from stream 301 to produce recycle stream 303, which is depleted in carbon dioxide relative to stream 301 and enriched in hydrogen gas relative to stream 301. Recycle stream 303 can then be used to transfer this mixture (depleted in carbon dioxide and enriched in hydrogen gas) back to vessel 204, thus driving the reactions in vessel 204 toward hydrogen production. As another example, in FIG. 3B, carbon dioxide and hydrogen gas can be transferred from vessel 102 via stream 301 to vessel 302. A sorbent (e.g., a sorbent in molten form) can be contained in vessel 302 and the sorbent can capture at least some of the carbon dioxide from stream 301 to produce recycle stream 303, which is depleted in carbon dioxide relative to stream 301 and enriched in hydrogen gas relative to stream 301. Recycle stream 303 can then be used to transfer this mixture (depleted in carbon dioxide and enriched in hydrogen gas) back to vessel 102, thus driving the reactions in vessel 102 toward hydrogen production.

Any of a variety of sorbents can be used to capture carbon dioxide. In some embodiments, the sorbent comprises a salt in molten form. In some embodiments, the salt in molten form comprises an alkali metal borate, $A_xB_{1-x}O_{1.5-x}$, where A is an alkali metal, B is Boron, O is Oxygen, and x is a number such that $0<x<1$. In some embodiments, the alkali metal comprises lithium (Li), sodium (Na), potassium (K), and/or a mixture of alkali metals. In some embodiments, the alkali metal comprises $Li_{0.5}Na_{0.5}$. Examples of sorbents that can be used as described, for example, in International Patent Application No. PCT/US2019/040961, filed Jul. 9, 2019, published as WO 2020/072115 on Apr. 9, 2020, and entitled "Carbon Dioxide Removal Using Sequestration Materials that Include Salts in Molten Form, and Related Systems and Methods," which is incorporated herein by reference in its entirety for all purposes. Additional examples of materials that can be used as sorbents to capture carbon dioxide are provided in more detail below.

In some embodiments, the sorbent is mixed with a catalyst. The catalyst can be used to increase the rate of a reaction within a vessel (e.g., a methane reforming reaction, a gasification reaction, a water gas shift reaction). In some embodiments, the catalyst comprises a transition metal. Examples of transition metals that can be used include but are not limited to nickel, zinc, and/or iron. Additional non-limiting examples of transition metals that can be used include ruthenium, rhodium, palladium, silver, osmium, iridium, platinum, and gold. Alloys or other combinations of these and/or other transition metals may also be used. In certain instances, it can be particularly desirable to use ruthenium and/or platinum, as these metals can exhibit enhanced catalytic activity.

In certain embodiments, the catalyst can be physically separated from the sorbent. That is to say, the sorbent may comprise one distinct phase, while the catalyst comprises another distinct phase. In some embodiments, the catalyst takes the form of solid particles suspended in the molten sorbent. In certain embodiments, the catalyst can be a solid suspension within the liquid molten sorbent where the catalyst can enhance a reaction in contact with the sorbent, the catalyst, or both. In some embodiments, the sorbent and the catalyst interact such that a catalytic metal is chemically incorporated into the molten salt. In some embodiments, the catalytic metal comprises a transition metal. In some embodiments, the transition metal comprises nickel, zinc, and/or iron. Other examples of transition metals are described elsewhere herein.

An environment to which the sorbent is exposed can, in certain embodiments, contain a mixture of gaseous fuel and steam. The gaseous fuel can be any of a variety of fuels. For example, in some embodiments, the gaseous fuel comprises natural gas, methane ($CH_4$), and/or a hydrocarbon of the form $C_nH_{2n+2}$, where n is an integer number. Non-limiting examples of hydrocarbons include ethane ($C_2H_6$), propane ($C_3H_8$), and butane ($C_4H_{10}$). In some embodiments, carbon monoxide and/or hydrogen gas can be used as a fuel. The gaseous fuel can be derived from a solid fuel, such as coal, biomass, and the like. In some embodiments, the fuel is gasified through a gasification reaction (e.g., a coal gasification reaction, a biomass gasification reaction, or the like).

In some embodiments, the fuel comprises a carbon-containing fuel. Examples of carbon-containing fuels include, but are not limited to, hydrocarbons (e.g., alkanes, alkynes, and/or alkenes), carbon monoxide, coal, and/or biomass.

Figure 3B:
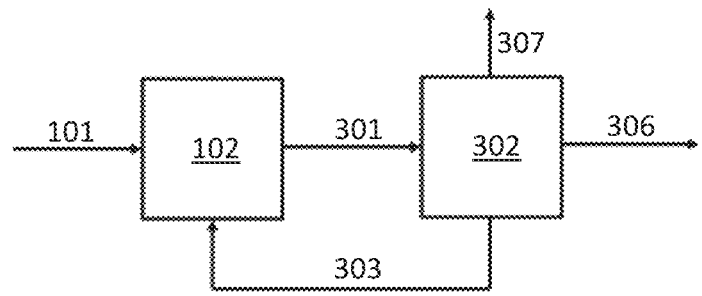

In some embodiments, the fuel can enter a reactor via an inlet stream. For example, in relation to FIG. 1, inlet 101 can be used to introduce a fuel (e.g., methane), along with water into vessel 102, where it can interact with a sorbent in vessel 102. As another example, in FIG. 2, inlet 201 can allow a stream of fuel and water (e.g., steam) to enter vessel 202. In addition, in FIG. 2, intermediate stream 203 can allow a stream of fuel (e.g., CO) to enter vessel 204 and steam may enter reactor 204 via stream 205. In FIG. 3A, inlet 201 can allow fuel and oxidant to enter vessel 202, and stream 203 can allow a stream of fuel (e.g., CO) to enter vessel 204. In FIG. 3B, fuel can be introduced into vessel 102 via inlet 101.

In some embodiments, the mixture to which the sorbent is exposed (e.g., a mixture of gaseous fuel and steam) further comprises oxygen, nitrogen, and/or sulfur. In some embodiments, the mixture further comprises argon or another inert gas (e.g., nitrogen gas). Non-limiting examples of other gases that may be included in the mixture include sulfur dioxide ($SO_2$), nitrogen dioxide ($NO_2$), hydrogen sulfide ($H_2S$), sulfur trioxide ($SO_3$), nitric oxide (NO), and/or carbonyl sulfide (COS).

The mixture of gaseous fuel and steam can be formed by mixing the gaseous fuel with steam (e.g., prior to entry of the components into a vessel and/or after entry of the components into the vessel). In some embodiments, the mixture of gaseous fuel and steam has a relatively high steam-to-carbon (S/C) ratio. In some embodiments, the ratio of steam-to-carbon is at least ½. Other ratios are possible. For example, in some embodiments, the S/C ratio can be at least ½, at least 1, at least 2, at least 4, at least 6, at least 8, or at least 10. In some embodiments, the S/C ratio can be less than or equal to 10, less than or equal to 8, less than or equal to 6, or less than or equal to 4. Combinations of these ranges are also possible (e.g., at least ½ and less than or equal to 10, at least 1 and less than or equal to 6, or at least 2 and less than or equal to 4). Other ratios are possible. In some embodiments, the S/C ratio is such that the fuel is not in stoichiometric excess. In some embodiments, the S/C ratio is such that the steam is in stoichiometric excess. In some embodiments, an upper bound of the S/C ratio is selected such that the size of the reactor can be kept at a reasonable value (e.g., to reduce capital cost).

The S/C ratio can be controlled by controlling an input stream of fuel (e.g., a carbon-containing fuel) or an input stream of steam. For example, in FIG. 2 inlet 205 can be used to control the amount of steam provided to vessel 204. Vessel 205 can contain a carbon-containing fuel, in addition to a sorbent. In some embodiments, the S/C can be determined prior to entering a vessel, and may enter a vessel with a predetermined ratio. For example, in FIG. 1, the fuel and steam entering through inlet stream 101 may already have a particular S/C when entering vessel 102.

The environment in which the sorbent is exposed to carbon dioxide can be at any of a variety of temperatures. For example, in some embodiments, the environment is at a temperature of above 100° C., above 200° C., or higher. In accordance with certain embodiments, it can be advantageous to maintain a temperature of the environment at a high temperature (e.g., above 100° C.) as this can increase the rate of a reaction and/or capture, and/or maintain a sorbent in molten form. In some embodiments, a temperature of a vessel in which the sorbent is contained is maintained at a high temperature (e.g., a constant temperature), at least in part, by the exothermic reaction between the sorbent and carbon dioxide. In some embodiments, a temperature of a reactor is maintained at a high temperature (e.g., a constant temperature), at least in part, by an external energy supply. In some embodiments, the external energy supply comprises combustion of a fuel to generate heat. In some embodiments, the external energy supply comprises concentration of solar energy to generate steam. More details regarding temperature of the environment are described below.

The environment in which the sorbent is exposed to carbon dioxide can be at any of a variety of pressures. The pressure of the environment can be selected in order to provide a thermodynamic benefit (e.g., providing greater conversion to hydrogen gas for a given temperature). In some embodiments, the pressure of the environment is above 1 bar. In some embodiments, the pressure is at least 1 bar, at least 2 bar, at least 5 bar, or at least 10 bar. In some embodiments, the pressure is less than or equal to 50 bar, less than or equal to 40 bar, less than or equal to 30 bar, less than or equal to 25 bar, or less than or equal to 20 bar. Combinations of the above-referenced ranges are also possible (e.g., at least 1 bar and less than or equal to 50 bar, or at least 10 bar and less than or equal to 20 bar). Other ranges are possible. In some embodiments, use of a molten sorbent (e.g., a molten sorbent in liquid form) can provide a sorbent that can be readily pumped while maintaining the pressure of the environment. By contrast and without wishing to be bound by any theory, solid particles (e.g., in the form of a fluidized bed) can be relatively more difficult to provide while maintaining the pressure of the environment, as solid particles can be harder to compress efficiently.

Some embodiments comprise releasing captured carbon dioxide in the gas phase to a second environment to upconcentrate carbon dioxide and regenerate the sorbent. This can, in accordance with certain embodiments, allow the sorbent to be recycled for subsequent capture of more carbon dioxide. The capture of additional carbon dioxide can further drive a reaction toward hydrogen production. For example, referring to FIG. 1, in some embodiments, carbon dioxide can be released via outlet 104 and can be transferred to a second environment (not shown). Referring to FIG. 2, in some embodiments, carbon dioxide can be released via outlet 207. As another example, referring to FIGS. 3A-3B, in some embodiments, carbon dioxide can be released via outlet 307. In some embodiments, the release of carbon dioxide is driven by a change in partial pressure, or a change in temperature, or both a change in partial pressure and a change in temperature, in the second environment.

According to certain embodiments, a relatively large amount of carbon dioxide can be sequestered by the sorbent (e.g., from an atmosphere, from a stream) during the exposure of the sorbent to an environment containing a mixture of gaseous fuel and steam. For example, in certain embodiments, at least 0.01 mmol of the carbon dioxide is sequestered (e.g., from an environment, from an atmosphere, from a stream) per gram of the sorbent. In some embodiments, at least 0.1 mmol, at least 0.5 mmol, at least 2.0 mmol, or at least 10.0 mmol of the carbon dioxide is sequestered (e.g., from an environment, from an atmosphere, from a stream) per gram of the sorbent. In certain embodiments, at most 20.0 mmol, at most 18.0 mmol, at most 16.0 mmol, at most 14.0 mmol, or at most 12.0 mmol of the carbon dioxide is sequestered (e.g., from an environment, from an atmosphere, from a stream) per gram of the sorbent. Combinations of the above-referenced ranges are also possible (e.g., between or equal to 0.01 mmol per gram and 20.0 mmol per gram, between or equal to 0.1 mmol per gram and 18.0 mmol per gram, between or equal to 2.0 mmol per gram and 12.0 mmol per gram). Other ranges are also possible. In some embodiments, between or equal to 0.01 mmol and 20.0 mmol of the carbon dioxide is sequestered from the environment per gram of the sorbent.

According to certain embodiments, at least a portion of the carbon dioxide interacts with the sorbent and is sequestered from an environment containing a mixture of gaseous fuel and steam, such as from an atmosphere or a stream as noted elsewhere herein, over a period of at least 10 seconds, at least 20 seconds, at least 30 seconds, or at least 1 minute. According to certain embodiments, at least a portion of the carbon dioxide interacts with the sorbent and is sequestered from an environment containing the carbon dioxide, such as from an atmosphere or a stream as noted elsewhere herein, over a period of 24 hours or less, 12 hours or less, 8 hours or less, 4 hours or less, 1 hour or less, 30 minutes or less, 10 minutes or less, or 2 minutes or less. Combinations of the above-referenced ranges are also possible (e.g., between or equal to 10 seconds and 24 hours, between or equal to 20 seconds and 12 hours, between or equal to 30 seconds and 8 hours, between or equal to 1 minute and 4 hours, between or equal to 1 minute and 10 minutes, between or equal to 1 minute and 2 minutes). Other ranges are also possible.

In certain embodiments, at least 0.01 mmol of the carbon dioxide is sequestered (e.g., from the atmosphere, from the stream) per gram of the sorbent per 24 hours. In some embodiments, at least 0.1 mmol, at least 0.5 mmol, at least 2.0 mmol, or at least 10.0 mmol of the carbon dioxide is sequestered from the stream per gram of the sorbent per 24 hours. According to some embodiments, at most 20.0 mmol, at most 18.0 mmol, at most 16.0 mmol, at most 14.0 mmol, or at most 12.0 mmol of the carbon dioxide is sequestered from the stream per gram of the sorbent per 24 hours. Combinations of the above-referenced ranges are also possible (e.g., between or equal to 0.01 mmol per gram and 20.0 mmol per gram, between or equal to 0.1 mmol per gram and 18.0 mmol per gram, between or equal to 2.0 mmol per gram and 12.0 mmol per gram). Other ranges are also possible.

The concentration of carbon dioxide in the fluid (e.g., a mixture of gaseous fuel and steam) to which the sorbent is exposed can be within a variety of ranges. In some embodiments, the environment (e.g., an atmosphere, a stream, a mixture of gaseous fuel and steam) to which the sorbent is exposed contains carbon dioxide in an amount of at least 1 ppm. In certain embodiments, the environment to which the sorbent is exposed contains carbon dioxide in an amount of at least 10 ppm, at least 1000 ppm, at least 0.01 mol %, at least 0.1 mol %, at least 1 mol %, at least 10 mol %, at least 50 mol %, or at least 99 mol %. The sorbent can be exposed, in some embodiments, to essentially pure carbon dioxide. In some embodiments, a method involves exposing the sorbent to an environment containing gaseous fuel and steam that comprises the carbon dioxide in an amount of at least 1 ppm.

As described above and elsewhere herein, in certain embodiments, the sorbent comprises a salt in molten form. For example, in some embodiments, a solid salt comprising an alkali metal cation and a boron oxide anion (and/or a dissociated form thereof) can be heated above its melting temperature which results in the solid transitioning into a liquid state. According to certain embodiments, the salt comprises an alkali metal cation and a boron oxide anion (and/or a dissociated form thereof) and is a salt having a melting point between or equal to 200° C. and 1000° C. (or between 200° C. and 700° C.) when at atmospheric pressure. Those of ordinary skill in the art would understand that a molten salt is different from a solubilized salt (i.e., a salt that has been dissolved within a solvent).

The composition of the salt can be selected to have a low melting temperature relative to other salts such that less energy is required to melt the salt. In addition, the composition of the salt can be selected in order to tune the melting point (e.g., melting temperature at 1 atm) of the salt, e.g., to approach or match the temperature at which the carbon dioxide, to which the salt is exposed, is emitted from a source of a mixture of gaseous fuel and/or steam.

The salt in molten form can have a number of chemical compositions. According to certain embodiments, the salt in molten form comprises at least one alkali metal cation and at least one boron oxide anion and/or a dissociated form thereof.

The term "alkali metal" is used herein to refer to the following six chemical elements of Group 1 of the periodic table: lithium (Li), sodium (Na), potassium (K), rubidium (Rb), cesium (Cs), and francium (Fr).

In some embodiments, the at least one alkali metal cation comprises cationic lithium (Li), sodium (Na), potassium (K), rubidium (Rb), and/or cesium (Cs). In some embodiments, the at least one alkali metal cation comprises cationic lithium (Li), sodium (Na), and/or potassium (K).

In some embodiments, the salt in molten form comprises at least one other metal cation. In some embodiments, the at least one other metal cation comprises an alkali metal cation, an alkaline earth metal cation, or a transition metal cation. In some embodiments, the salt in molten form comprises at least two alkali metal cations (e.g., 3 alkali metal cations). In certain embodiments, the salt in molten form comprises cationic lithium and cationic sodium.

Uptake of carbon dioxide by a sorbent in accordance with some embodiments can be at any of a variety of desirable levels. Uptake by a sorbent comprising a salt in molten form, with the salt including an alkali metal cation and a boron oxide anion and/or a dissociated form thereof, may be as much as or greater than 5 mmol of the carbon dioxide per gram of sorbent within 1 minute of exposure to the carbon dioxide, a significantly faster rate of uptake than for solid particulate sorbents of similar composition under similar conditions.

In addition, the ability to flow the sorbent comprising a salt in molten form facilitates, in accordance with some embodiments, a continuous $CO_2$ capture process from the stream containing the carbon dioxide. For example, in some embodiments, the $CO_2$-loaded sorbent can be flowed from a capture vessel (e.g., an adsorber vessel from a reforming process, such as a steam methane reforming process) to a release vessel (e.g., a desorber vessel), and/or an unloaded sorbent can be flowed from a release vessel (e.g., a desorber vessel) to a capture vessel (e.g., an adsorber vessel) to capture more $CO_2$, for a plurality of cycles without halting the process. Continuous operation provides, in some embodiments, advantages including but not limited to a reduced duration $CO_2$ gas capture process, potentially reduced energy input required in the $CO_2$ capture process, and/or the ability to refresh poisoned sorbent with a purge rather than taking a unit offline.

As used herein, "loaded" sorbent refers to sorbent at least a portion of which (e.g., between or equal to 1 wt % and 90 wt %) has sequestered carbon dioxide.

As used herein, "unloaded" sorbent refers to sorbent at least a portion of which (e.g., between or equal to 75 wt % and 100 wt %, between or equal to 85 wt % and 100 wt %, between or equal to 95 wt % and 100 wt %) has had carbon dioxide removed.

Another important advantage associated with the use of a sorbent comprising a salt in molten form, in accordance with certain embodiments, is the ability to use the sorbent at an elevated temperature. In some embodiments, the sorbent comprising a salt in molten form can be at a temperature greater than or equal to the melting temperature of the sorbent (e.g., greater than or equal to 200° C.). The temperature can be higher as well, e.g., greater than or equal to 250° C., greater than or equal to 300° C., greater than or equal to 350° C., greater than or equal to 400° C., greater than or equal to 450° C., or greater than or equal to 500° C., or higher. In some embodiments in which the sorbent is used at an elevated temperature, any of a variety of suitable amounts of the sorbent (e.g., greater than or equal to 1 wt %, greater than or equal to 10 wt %, greater than or equal to 50 wt %, greater than or equal to 75 wt %, greater than or equal to 90 wt %, greater than or equal to 99 wt %, or all of the sorbent) will be at that elevated temperature (e.g., greater than or equal to 200° C., greater than or equal to 250° C., greater than or equal to 300° C., greater than or equal to 350° C., greater than or equal to 400° C., greater than or equal to 450° C., greater than or equal to 500° C., and/or within any of the other temperature ranges mentioned above or elsewhere herein).

A salt in molten form comprising cationic lithium and cationic sodium may, in some embodiments, provide advantages in a temperature swing operation, e.g., relative to an analogous salt in molten form comprising cationic sodium or an analogous salt in molten form comprising cationic lithium, cationic sodium, and cationic potassium. One advantage of a salt in molten form comprising cationic lithium and cationic sodium may have a higher uptake capacity of carbon dioxide, in a temperature range of between or equal to 500° C. and 700° C., than an analogous salt in molten form comprising cationic sodium or an analogous salt in molten form comprising cationic lithium, cationic sodium, and cationic potassium. Another advantage of a salt in molten form comprising cationic lithium and cationic sodium may be that a lesser temperature difference can be employed in a temperature swing operation for the same regeneration efficiency of the capture and release of the carbon dioxide (e.g., a temperature difference of between or equal to 0.25 and 0.5 times the temperature difference employed for analogous salts) relative to an analogous salt in molten form comprising cationic sodium or an analogous salt in molten form comprising cationic lithium, cationic sodium, and cationic potassium.

The term "alkaline earth metal" is used herein to refer to the six chemical elements in Group 2 of the periodic table: beryllium (Be), magnesium (Mg), calcium (Ca), strontium (Sr), barium (Ba), and radium (Ra).

The "transition metal" elements are scandium (Sc), yttrium (Y), lanthanum (La), actinium (Ac), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), meitnerium (Mt), nickel (Ni), palladium (Pd), platinum (Pt), darmstadtium (Ds), copper (Cu), silver (Ag), gold (Au), roentgenium (Rg), zinc (Zn), cadmium (Cd), mercury (Hg), and copernicium (Cn).

In certain embodiments, it may be advantageous for the salt in molten form to comprise an alkali metal cation and one other metal cation at a composition at or near a eutectic composition, such that the melting temperature of the salt is lower than the melting temperature of a salt with a different composition of the alkali metal cation and the one other metal cation, reducing the energy required to attain the salt in molten form for an operation for the sequestration of carbon dioxide.

Certain of the sorbents described herein have relatively low melting temperatures and may promote sequestration (e.g., capture) of carbon dioxide at relatively low temperatures. For example, components that are capable of forming eutectic compositions with each other have reduced melting points at the eutectic composition and at compositions surrounding the eutectic composition in comparison to compositions in which the components are present in other relative amounts. As another example, compositions comprising alkali metal cations and/or alkaline earth metal cations have relatively low melting points in comparison to compositions comprising other metal cations. The ability to capture carbon dioxide at relatively low temperatures can be advantageous as it may, according to certain although not necessarily all embodiments, reduce the amount of energy required to capture carbon dioxide.

In some embodiments the sorbent comprises at least two components (e.g., metal cations, alkali metal cations) that are capable of forming a eutectic composition with each other. As would be understood by one of ordinary skill in the art, a "eutectic composition" is a composition that melts at a temperature lower than the melting points of the composition's constituents. In some eutectic compositions, the liquid phase is in equilibrium with both a first solid phase and a second solid phase different from the first solid phase at the eutectic temperature. A eutectic composition that is cooled from a temperature above the eutectic temperature to a temperature below the eutectic temperature under equilibrium cooling conditions undergoes, in certain cases, solidification at the eutectic temperature to form a first solid phase and a second solid phase simultaneously from a liquid. As would also be understood by one of ordinary skill in the art, two components that are capable of forming a eutectic composition with each other are, in certain cases, also able to form non-eutectic compositions with each other. Non-eutectic compositions often undergo solidification over a range of temperatures because liquid phases may be in equilibrium with solid phases over a range of temperatures.

The term "boron oxide anion" is used herein to refer to a negatively charged ion comprising at least one boron and at least one oxygen. The boron oxide anion in the salt in molten form can be intact (e.g., in anionic $B_wO_z$ form, e.g., $(BO_3^{3-})$) and/or the boron and oxygen can be dissociated from one another (e.g., into boron cation(s) and oxygen anion(s), e.g., as $B^{3+}$ and $O^{2-}$).

According to some embodiments, the at least one boron oxide anion comprises anionic $B_wO_z$ and/or a dissociated form thereof. In some embodiments, w is greater than 0 and less than or equal to 4. In certain embodiments, w is between or equal to 1 and 4. In some embodiments, z is greater than 0 and less than or equal to 9. In certain embodiments, z is between or equal to 1 and 9. In some embodiments, the at least one boron oxide anion comprises anionic $BO_3$, $BO_4$, or $B_2O_5$ and/or a dissociated form thereof. In certain embodiments, it may be advantageous to have a salt in molten form comprise anionic $BO_3$ and/or a dissociated form thereof. A potential advantage of anionic $BO_3$ and/or a dissociated form thereof may include a greater carbon dioxide uptake capacity of the salt in molten form during exposure to an environment containing carbon dioxide, relative to a salt having the same alkali metal cation (and any other cations) and anionic $B_2O_5$ and/or a dissociated form thereof. Another potential advantage of anionic $BO_3$ and/or a dissociated form thereof may include a greater carbon dioxide release of the salt in molten form during exposure to release conditions, relative to a salt having the same alkali metal cation (and any other cations) and anionic $BO_4$ and/or a dissociated form thereof.

In some embodiments, the boron oxide anion comprises $B_wO_z$ and/or a dissociated form thereof, wherein w is greater than 0 and less than or equal to 4 and z is greater than 0 and less than or equal to 9.

In some embodiments, the fractional stoichiometry of a salt described herein can be expressed as $M_xB_{1-x}O_y$, wherein x is a mixing ratio and is between zero and 1. In some embodiments, the fractional stoichiometry is that of the salt in solid form, e.g., before melting. In some embodiments, the fractional stoichiometry is that of the salt in molten form, e.g., after melting. In certain embodiments, y=1.5−x. "M" in this formula refers to the metal cation(s) (e.g., an alkali metal cation, a combination of an alkali metal cation and at least one other metal cation) in a sorbent described herein. For example, in some embodiments, the fractional stoichiometry of a salt described herein can be expressed as $A_xB_{1-x}O_y$, where 0<x<1 and A is an alkali metal (e.g., Li, Na, K). In certain such embodiments, y=1.5−x.

As used herein, the term "mixing ratio" of an alkali metal cation or combination of metal cations in a sorbent refers to the ratio of moles of metal cation(s) in a sorbent to the total of moles of metal cation(s) plus moles of boron in the sorbent. For example, the mixing ratio of sodium in $Na_3BO_3$ is 3/(3+1)=0.75; the mixing ratio of alkali metals in $(Li_{0.5}Na_{0.5})_3BO_3$ is (0.5*3+0.5*3)/(3+1)=0.75. In some embodiments, the mixing ratio is at least 0.5, at least 0.6, or at least 0.667. In some embodiments, the mixing ratio is at most 0.9, at most 0.835, at most 0.8, at most 0.75, or at most 0.7. Combinations of the above-referenced ranges are also possible (e.g., between or equal to 0.5 and 0.9, between or equal to 0.6 and 0.8, between or equal to 0.7 and 0.8). Other ranges are also possible. Without wishing to be bound by theory, there may be a mixing ratio (for a certain alkali metal cation or combination of metal cations) below which the carbon dioxide uptake capacity of the sorbent is less than desirable. Without wishing to be bound by theory, there may be a mixing ratio (for a certain alkali metal cation or combination of metal cations) above which the regeneration efficiency of the sorbent is less than desirable. In some embodiments, the alkali metal comprises lithium (Li), sodium (Na), potassium (K), and/or a mixture of these. In some embodiments, the alkali metal comprises Li and Na in equal amounts.

Non-limiting examples of the salt in molten form include but are not limited to $Na_3BO_3$ (which could also be written as, e.g., $Na_{0.75}B_{0.25}O_{0.75}$), $Na_5BO_4$ (which could also be written as, e.g., $Na_{0.83}B_{0.17}O_{0.67}$), $Na_4B_2O_5$ (which could also be written as, e.g., $Na_2BO_{2.5}$), $K_3BO_3$ (which could also be written as, e.g., $K_{0.75}B_{0.25}O_{0.75}$), $(Li_{0.5}Na_{0.5})_3BO_3$, and/or $(Li_{0.33}\ Na_{0.33}K_{0.33})_3BO_3$, or a combination thereof, in molten form.

In some embodiments, the salt of the sorbent that is in molten form may be accompanied by portions of that salt that are not molten. That is to say, complete melting of all of the salt type(s) that are present in molten form is not required in all embodiments. In some embodiments, at least 10 wt %, at least 20 wt %, at least 30 wt %, at least 40 wt %, at least 50 wt %, at least 60 wt %, at least 70 wt %, at least 80 wt %, at least 90 wt %, or more of the salt present within the sorbent is molten. In some embodiments, less than 100 wt %, less than 99 wt %, less than 90 wt %, or less of the salt that is present within the sorbent is molten. Combinations of the above-referenced ranges are also possible. Other ranges are also possible.

In some embodiments, the sorbent comprises at least one salt comprising at least one alkali metal cation and at least one boron oxide anion and/or a dissociated form thereof (e.g., including, but not limited to, $Na_3BO_3$, $Na_5BO_4$, $Na_4B_2O_5$, $K_3BO_3$, $(Li_{0.5}Na_{0.5})_3BO_3$, and/or $(Li_{0.33}Na_{0.33}K_{0.33})_3BO_3$) for which at least 10 wt %, at least 20 wt %, at least 30 wt %, at least 40 wt %, at least 50 wt %, at least 60 wt %, at least 70 wt %, at least 80 wt %, at least 90 wt %, or more of that salt is molten. In some embodiments, the sorbent comprises at least one salt comprising at least one alkali metal cation and at least one boron oxide anion and/or a dissociated form thereof (e.g., including, but not limited to, $Na_3BO_3$, $Na_5BO_4$, $Na_4B_2O_5$, $K_3BO_3$, $(Li_{0.5}Na_{0.5})_3BO_3$, and/or $(Li_{0.33}Na_{0.33}K_{0.33})_3BO_3$) for which less than 100 wt %, less than 99 wt %, less than 90 wt %, or less of that salt is molten. Combinations of the above-referenced ranges are also possible. Other ranges are also possible.

In some embodiments, in the sorbent, the total amount of all salts that comprise at least one alkali metal cation and at least one boron oxide anion and/or a dissociated form thereof and that is in molten form is at least 10 wt %, at least 20 wt %, at least 30 wt %, at least 40 wt %, at least 50 wt %, at least 60 wt %, at least 70 wt %, at least 80 wt %, at least 90 wt %, or more. As a non-limiting exemplary illustration, in some embodiments, the sorbent can be a combination of 50 grams of $Na_3BO_3$, 50 grams of $Na_5BO_4$, and 50 grams of $Na_4B_2O_5$, and in some such embodiments, at least 15 grams (i.e., 10 wt % of 150 total grams) of the total amount of $Na_3BO_3$, $Na_5BO_4$, and $Na_4B_2O_5$ is molten. In certain embodiments, in the sorbent, the total amount of all salts that comprise at least one alkali metal cation and at least one boron oxide anion and/or a dissociated form thereof and that is in molten form is less than 100 wt %, less than 99 wt %, less than 90 wt %, less than 50%, less than 40%, less than 30%, less than 20%, or less. Combinations of the above-referenced ranges are also possible. Other ranges are also possible.

In some embodiments, a sorbent further comprises an additive. Examples of types of additives that may be included in a sorbent include but are not limited to corrosion inhibitors, viscosity modifiers, wetting agents, high-temperature surfactants, and scale inhibitors. In some embodiments, the sorbent comprises a plurality of additives (e.g., two, three, four, or more).

In some embodiments, during exposure to an environment comprising carbon dioxide, at least a portion of the salt in molten form chemically reacts with at least some of the carbon dioxide (e.g., reactions with at least some $CO_2$) and forms one or more products (e.g., comprising a carbonate, comprising nitrate, comprising nitrite, comprising sulfate, comprising sulfite) within the sorbent. These one or more products (e.g., carbonate products, nitrate products, nitrate products, sulfate products, sulfite products) may be in solid form or in liquid form, depending, e.g., on the temperature and/or composition of the salt (e.g., alkali metal borate).

Certain embodiments are related to a sorbent material. As used herein, the phrase "sorbent" is used to describe a material that is capable of removing carbon dioxide (e.g., carbon dioxide, $CO_2$) from a gaseous mixture (e.g., a gaseous mixture of fuel and steam) containing the carbon dioxide. In some embodiments, the sorbent may function as a sequestration material.

In some embodiments, the sorbent may function as an absorption material. That is to say, the sorbent may be capable of absorbing carbon dioxide. In some embodiments, the sorbent may function as an adsorption material. That is to say, the sorbent may be capable of adsorbing carbon dioxide. In some embodiments, the sorbent may chemically react with the carbon dioxide. In some embodiments, the carbon dioxide may diffuse into the sorbent. Combinations of these mechanisms are also possible. For example, in some embodiments, the sorbent may capture the carbon dioxide via chemisorption. Other capture mechanisms may exist.

Regeneration of the sorbent can involve a process that is the reverse of the process used to capture the carbon dioxide. For example, if the sorbent captures the carbon dioxide via a chemical reaction, regeneration of the sorbent can involve, in certain cases, allowing the reverse of the chemical reaction used to capture the carbon dioxide to proceed. As another example, if the sorbent captures the carbon dioxide via adsorption, regeneration of the sorbent can involve breaking the adsorptive bonds between the sorbent and the captured carbon dioxide.

In some embodiments, during exposure to carbon dioxide, at least a portion of the salt in molten form chemically reacts with at least some of the carbon dioxide and forms solid particles (e.g., comprising a carbonate, a sulfate, a sulfite, a nitrate, a nitrite) within the sorbent, increasing the viscosity of the sorbent. These solid particles loaded with the carbon dioxide can be flowed within remaining salt in molten form using a slurry pump to a regeneration vessel (e.g., a desorber) to be regenerated (e.g., regeneration of salt in molten form from the solid particulates), or alternatively these solid particles may be regenerated within the same vessel in which the solid particles were formed.

In certain embodiments, the temperature of the sorbent is less than or equal to 1000° C. during at least a portion of the sequestration of the carbon dioxide during exposure to a mixture of gaseous fuel and steam. In certain embodiments, the sorbent is at a temperature greater than the melting temperature of the salt during at least a portion of the sequestration of the carbon dioxide, such that the salt is in molten form. In certain embodiments, the temperature of the sorbent is at most 1000° C., at most 850° C., at most 600° C., at most 550° C., or at most 520° C. during at least a portion of the sequestration of the carbon dioxide. In some embodiments, the temperature of the sorbent is at least 200° C., at least 300° C., at least 400° C., at least 450° C., or at least 500° C. during at least a portion of the sequestration of the carbon dioxide. Combinations of the above-referenced ranges are also possible (e.g., between or equal to 200° C. and 1000° C., between or equal to 200° C. and 600° C., between or equal to 400° C. and 550° C.). Other ranges are also possible.

In certain embodiments, the temperature of the environment containing carbon dioxide (e.g., a mixture of gaseous fuel and steam) is less than or equal to 1000° C. during at least a portion of the sequestration of the carbon dioxide. In certain embodiments, the temperature of the environment containing carbon dioxide is at most 1000° C., at most 850° C., at most 600° C., at most 550° C., or at most 520° C. during at least a portion of the sequestration of the carbon dioxide. In some embodiments, the temperature of the environment containing carbon dioxide is at least 200° C., at least 300° C., at least 400° C., at least 450° C., or at least 500° C. during at least a portion of the sequestration of the carbon dioxide. Combinations of the above-referenced ranges are also possible (e.g., between or equal to 200° C. and 1000° C., between or equal to 200° C. and 600° C., between or equal to 400° C. and 550° C.). Other ranges are also possible.

In some embodiments, a relatively large percentage of the sorbent is made up of a salt in molten form. For example, in some embodiments, at least 10 weight percent (wt %), at least 20 wt %, at least 30 wt %, at least 40 wt %, at least 50 wt %, at least 60 wt %, at least 70 wt %, at least 80 wt %, at least 90 wt %, or more of the sorbent is made up of a salt in molten form. In some embodiments, at most 100 wt %, at most 99 wt %, or at most 90 wt % of the sorbent is made up of a salt in molten form. Combinations of the above-referenced ranges are also possible (e.g., between or equal to 10 wt % and 100 wt %, between or equal to 20 wt % and 99 wt %, between or equal to 50 wt % and 90 wt %). Other ranges are also possible. In some embodiments, all of the sorbent is molten. In other embodiments, only a portion of the sorbent is molten.

In some embodiments, a relatively large percentage of the sorbent is chemically converted to carbon dioxide-loaded solid particles during sequestration (e.g., capture). For example, in some embodiments, at least 1 wt %, at least 10 wt %, or at least 20 wt % of the sorbent is made up of carbon dioxide-loaded solid particles. In some embodiments, at most 90 wt %, at most 80 wt %, or at most 50 wt % of the sorbent is made up of carbon dioxide-loaded solid particles. Combinations of the above-referenced ranges are also possible (e.g., between or equal to 1 wt % and 90 wt %, between or equal to 10 wt % and 80 wt %, between or equal to 10 wt % and 50 wt %, between or equal to 20 wt % and 50 wt %). Other ranges are also possible.

In some embodiments, a relatively large weight percentage of the sorbent sequesters carbon dioxide during exposure of the sorbent to an environment (e.g., an environment containing a mixture of gaseous fuel and steam). For example, in some embodiments, at least 0.01 wt %, at least 10 wt %, or at least 20 wt % of the sorbent sequesters carbon dioxide during sequestration. In some embodiments, at most 100%, at most 90 wt %, at most 80 wt %, or at most 50 wt % of the sorbent sequesters carbon dioxide during sequestration. Combinations of the above-referenced ranges are also possible (e.g., between or equal to 0.01 wt % and 100 wt %, between or equal to 10 wt % and 90 wt %, between or equal to 10 wt % and 80 wt %, between or equal to 20 wt % and 50 wt %). Other ranges are also possible.

In some embodiments, the sorbent also comprises a hydroxide of an alkali metal. For example, in some embodiments, the sorbent comprises NaOH, KOH, and/or LiOH. According to certain embodiments, a hydroxide of an alkali metal can be formed as a by-product of a reaction between the sorbent and carbon dioxide.

In some embodiments, a sorbent is capable of interacting with carbon dioxide such that at least 0.01 mmol of the carbon dioxide is sequestered (e.g., from an environment, from an atmosphere, from a stream, from a mixture of gases) per gram of the sorbent. In some embodiments, the sorbent is capable of interacting with carbon dioxide such that at least 0.1 mmol, at least 0.5 mmol, at least 2.0 mmol, or at least 10.0 mmol of the carbon dioxide is sequestered per gram of the sorbent. In certain embodiments, the sorbent is capable of interacting with the carbon dioxide such that at most 20.0 mmol, at most 18.0 mmol, at most 16.0 mmol, at most 14.0 mmol, or at most 12.0 mmol of the carbon dioxide is sequestered per gram of the sorbent. Combinations of the above-referenced ranges are also possible (e.g., between or equal to 0.1 mmol per gram and 20.0 mmol per gram, between or equal to 0.5 mmol per gram and 16.0 mmol per gram, between or equal to 2.0 mmol per gram and 12.0 mmol per gram). Other ranges are possible.

According to certain embodiments, the sorbent is capable of interacting with carbon dioxide such that a relatively large amount of the carbon dioxide is sequestered even when the carbon dioxide concentration in the mixture of gaseous fuel and steam is low. For example, in some embodiments, the sorbent is capable of sequestering at least 0.01 mmol, at least 0.1 mmol, at least 0.5 mmol, at least 2.0 mmol, at least 10.0 mmol and/or at most 20.0 mmol, at most 18.0 mmol, at most 16.0 mmol, at most 14.0 mmol, or at most 12.0 mmol of the carbon dioxide per gram of the sorbent when the sorbent is exposed to a steady state environment containing as little as 50 mol %, as little as 25 mol %, as little as 10 mol %, or as little as 1 mol % of the gas (e.g., with the balance of the mixture comprising at least steam).

In some embodiments, the sorbent is capable of interacting with carbon dioxide such that a relatively large amount of the carbon dioxide is sequestered even at relatively low temperatures. For example, in some embodiments, the sorbent is capable of sequestering at least 0.01 mmol, at least 0.1 mmol, at least 0.5 mmol, at least 2.0 mmol, at least 10.0 mmol and/or at most 20.0 mmol, at most 18.0 mmol, at most 16.0 mmol, at most 14.0 mmol, or at most 12.0 mmol of the carbon dioxide per gram of the sorbent when the sorbent is at a temperature of 1000° C. or less, at a temperature of 850° C. or less, at a temperature of 600° C. or less, at a temperature of 550° C. or less, or at a temperature of 520° C. or less (and/or, at a temperature of at least 200° C., at least 300° C., at least 400° C., at least 450° C., or at least 500° C.). Combinations of the above-referenced ranges are also possible (e.g., between or equal to 200° C. and 1000° C., between or equal to 200° C. and 600° C., between or equal to 400° C. and 550° C.). Other ranges are also possible.

According to certain embodiments, the salt of the sorbent has a melting temperature at 1 atm within a range high enough to provide a high rate of sequestration of carbon dioxide, but not so high as to make the sequestration of the carbon dioxide an overly energy-intensive process. In some embodiments, the salt of the sorbent has a melting temperature at 1 atm of at least 200° C., at least 300° C., at least 400° C., at least 450° C., or at least 500° C. In some embodiments, the salt of the sorbent has a melting temperature at 1 atm of at most 1000° C., at most 850° C., at most 600° C., at most 550° C., or at most 520° C. Combinations of the above-referenced ranges are also possible (e.g., between or equal to 200° C. and 1000° C., between or equal to 200° C. and 600° C., between or equal to 400° C. and 550° C.). Other ranges are also possible.

According to certain embodiments, the sorbent is capable of interacting with carbon dioxide such that a relatively large amount of the carbon dioxide is sequestered over a relatively short period of time. For example, in some embodiments, the sorbent is capable of sequestering at least 0.01 mmol, at least 0.1 mmol, at least 0.5 mmol, at least 2.0 mmol, at least 10.0 mmol and/or at most 20.0 mmol, at most 18.0 mmol, at most 16.0 mmol, at most 14.0 mmol, or at most 12.0 mmol of the carbon dioxide per gram of the sorbent when the sorbent is exposed to an environment containing the carbon dioxide for a period of 24 hours or less, 12 hours or less, 8 hours or less, 4 hours or less, 1 hour or less, 30 minutes or less, 10 minutes or less, or 2 minutes or less (and/or, at least 10 seconds, at least 20 seconds, at least 30 seconds, or at least 1 minute). Combinations of the above-referenced ranges are also possible (e.g., between or equal to 10 seconds and 24 hours, between or equal to 20 seconds and 12 hours, between or equal to 30 seconds and 8 hours, between or equal to 1 minute and 4 hours, between or equal to 1 minute and 10 minutes, between or equal to 1 minute and 2 minutes). Other ranges are also possible.

The amount of carbon dioxide sequestered by a sorbent can be determined, for example, using thermogravimetric analysis.

In addition to sorbents, methods of capturing carbon dioxide using sorbents are also described. For example, certain of the sorbents described herein can be used to remove carbon dioxide from a chemical process stream (e.g., the exhaust stream of a combustion system) and/or from an environment containing carbon dioxide (e.g., an environment within a reactor or other unit operation).

In some embodiments, a temperature of a reactor is maintained at a constant temperature internally by reaction (e.g., an exothermic reaction) between the sorbent and carbon dioxide.

In some embodiments, a temperature of a reactor is maintained at a constant temperature by an external energy supply. In some embodiments, the external energy supply comprises combustion of a fuel to generate heat. In some embodiments, the external energy supply comprises concentration of solar energy to generate steam.

The sorbents described herein can be used to remove carbon dioxide within a mixture of gas (e.g., a mixture of gaseous fuel and steam) generated by a variety of systems. In some embodiments, the sorbent is used to remove carbon dioxide from a stream of a hydrogen generation process. In some embodiments, the industrial process is a gasification process and generates fuel from solid mass, such as coal, biomass, and/or hydrocarbons comprising the formula $C_nH_{2n+2}$, where n is an integer number.

The fuel of the mixture of gaseous fuel can be generated from synthesis gas or syn gas. As used here in, "syn gas" has its usual meaning in the art to describe a gas comprising hydrogen gas and carbon monoxide.

In some embodiments, the mixture (e.g., the mixture of gaseous fuel and steam) further comprises oxygen, nitrogen, and/or sulfur. In some embodiments, the mixture can comprise argon or other inert gases.

In some embodiments, the method comprises releasing captured carbon dioxide in the gas phase to a second environment to upconcentrate carbon dioxide and regenerate the sorbent. Release of carbon dioxide and regeneration of a sorbent are described below and elsewhere herein. For example, the release can be driven by a change in partial pressure, or a change in temperature, or both a change in partial pressure and a change in temperature, in the second environment.

In some embodiments, a method can further comprise regenerating the sorbent by removing, from the sorbent, at least 50 mol % of the carbon dioxide sequestered by the sorbent. In some embodiments, at least 80 mol %, at least 90 mol %, at least 95 mol %, at least 99 mol %, or at least 99.9 mol % of the carbon dioxide sequestered by the sorbent is removed from the sorbent. In some embodiments, the sorbent remains in a liquid state throughout the sequestration and regeneration process. For example, in some embodiments, the salt remains in a liquid state throughout the sequestration and regeneration process.

In certain embodiments, a method can comprise performing at least one sequestration/regeneration cycle (e.g., at least one temperature swing cycle, at least one pressure swing cycle). Each sequestration/regeneration cycle is made up of a sequestration step (in which carbon dioxide is sequestered by the sorbent) followed by a regeneration step (in which carbon dioxide is released by the sorbent). According to certain embodiments, the sorbent can be subject to a relatively large number of sequestration/regeneration cycles while maintaining the ability to sequester and release relatively large amounts of carbon dioxide.

According to certain embodiments, a method may comprise cycling the sorbent at least 2 (or at least 5, at least 10, at least 50, at least 100, at least 1000, or at least 10,000) times. In some such embodiments, during each of the 2 (or during each of the 5, each of the 10, each of the 50, each of the 100, each of the 1000, and/or each of the 10,000) sequestration steps of the cycles, the amount of carbon dioxide that is sequestered by the sorbent is at least 75%, at least 90%, at least 95%, at least 98%, at least 99%, or at least 99.9% of the amount of carbon dioxide that is sequestered by the sorbent during an equivalent sequestration step of the $1^{st}$ cycle. In some such embodiments, during each of the 2 (or during each of the 5, each of the 10, each of the 50, each of the 100, each of the 1000, and/or each of the 10,000) regeneration steps of the cycles, the amount of carbon dioxide that is released by the sorbent is at least 75%, at least 90%, at least 95%, at least 98%, at least 99%, or at least 99.9% of the amount of carbon dioxide that is released by the sorbent during an equivalent regeneration step of the $1^{st}$ cycle. In some such embodiments, the amount of carbon dioxide that is released by the sorbent during the regeneration step of the $1^{st}$ cycle is at least 75%, at least 90%, at least 95%, at least 98%, at least 99%, or at least 99.9% of the amount of carbon dioxide that is sequestered by the sorbent during the sequestration step of the $1^{st}$ cycle. In some such embodiments, the amount of carbon dioxide that is sequestered during the sequestration step of the $1^{st}$ cycle, the $10^{th}$ cycle, and/or the $100^{th}$ cycle is at least 0.01 mmol, at least 0.1 mmol, at least 0.5 mmol, at least 2.0 mmol, or at least 10.0 mmol (and/or at most 20.0 mmol, at most 18.0 mmol, at most 16.0 mmol, at most 14.0 mmol, or at most 12.0 mmol) per gram of the sorbent. In certain embodiments, the temperature of the sorbent during the sequestration/regeneration cycles is at most 1000° C., at most 850° C., at most 600° C., at most 550° C., or at most 520° C. (and/or at least 200° C., at least 300° C., at least 400° C., at least 450° C., or at least 500° C.). In certain embodiments, the time over which each of the sequestration steps and each of the regeneration steps occurs is 24 hours or less (or 12 hours or less, 8 hours or less, 4 hours or less, 1 hour or less, 30 minutes or less, 10 minutes or less, or 2 minutes or less, and/or at least 10 seconds, at least 20 seconds, at least 30 seconds, or at least 1 minute). In some embodiments, the steady state concentration of carbon dioxide in the environment to which the sorbent is exposed during the sequestration steps of the sequestration/regeneration cycles is as little as 50 mol %, as little as 25 mol %, as little as 10 mol %, or as little as 1 mol % carbon dioxide (e.g., with the balance of the environment being gaseous fuel or steam, or an inert gas such as argon).

The sorbent can be exposed to any of the environments (e.g., atmospheres, streams) described above or elsewhere herein during one or more (or all) of the sequestration steps of the one or more sequestration/regeneration cycles. One or more (or all) of the regeneration steps of the sequestration/regeneration cycles can be performed using a variety of suitable second environments (e.g., fluids, atmospheres, streams). In some embodiments, regeneration of the sorbent can be performed by flowing an inert gas (e.g., argon, $N_2$) over the sorbent. Non-limiting examples of suitable environment components that can be used during the regeneration step include a flow of 100 mol % $N_2$, or a flow of air.

In certain embodiments, regeneration of the sorbent can comprise a pressure swing operation. Generally, in a pressure swing operation, in accordance with certain embodiments described herein, the sorbent is exposed to an environment having a first partial pressure of carbon dioxide (e.g., during exposure of the sorbent to an environment containing the carbon dioxide), and subsequently the carbon-dioxide-loaded sorbent is exposed to a second environment having second lower partial pressure of the carbon dioxide (e.g., 0 bar of the carbon dioxide), regenerating loaded sorbent. This pressure swing operation may be repeated for a plurality of cycles once the sorbent has been regenerated. The first partial pressure of the carbon dioxide may be at least 0.000001 bar, at least 0.0001 bar, at least 0.01 bar, or at least 1 bar. The first partial pressure of the carbon dioxide may be at most 30 bar, at most 20 bar, at most 10 bar, or at most 5 bar. Combinations of the above-referenced ranges are also possible (e.g., between or equal to 0.000001 bar and 30 bar, between or equal to 0.01 bar and 20 bar, between or equal to 0.1 bar and 10 bar, between or equal to 1 bar and 5 bar). Other ranges are also possible. The second partial pressure of the carbon dioxide may be less than the first partial pressure of the carbon dioxide by at least 0.000001 bar, at least 0.0001 bar, at least 0.01 bar, or at least 1 bar. The second partial pressure of the carbon dioxide may be less than the first partial pressure of the carbon dioxide by at most 30 bar, at most 20 bar, at most 10 bar, or at most 5 bar. Combinations of the above-referenced ranges are also possible (e.g., between or equal to 0.001 bar and 30 bar less, between or equal to 0.01 bar and 20 bar less, between or equal to 0.1 bar and 10 bar less, between or equal to 1 bar and 5 bar less). Other ranges are also possible.

The regeneration of the sorbent can optionally take place in a temperature swing operation. Generally in a temperature swing operation, in accordance with certain embodiments described herein, the sorbent is cycled to a first temperature, during exposure of the sorbent to an environment containing carbon dioxide, and subsequently the carbon dioxide-loaded sorbent is cycled to a second higher temperature in a second environment containing less or no carbon dioxide, regenerating the loaded sorbent. This temperature swing operation may be repeated for a plurality of cycles once the sorbent has been regenerated. The first temperature may be greater than or equal to the melting temperature of the sorbent, e.g., greater than or equal to 200° C. The first temperature can be higher as well, e.g., greater than or equal to 250° C., greater than or equal to 300° C., greater than or equal to 350° C., greater than or equal to 400° C., greater than or equal to 450° C., or greater than or equal to 500° C. or higher, and/or less than or equal to 1000° C. In some embodiments, the second temperature is greater than the first temperature by at least 10° C., at least 50° C., at least 100° C., at least 200° C., at least 300° C., at least 400° C., or at least 500° C. The second temperature may be greater than the first temperature by at most 1000° C., at most 900° C., at most 800° C., at most 700° C., or at most 600° C. Combinations of the above-referenced ranges are also possible (e.g., between or equal to 10° C. and 300° C. greater, between or equal to 200° C. and 400° C. greater, between or equal to 400° C. and 1000° C. greater). Other ranges are also possible.

The following applications are incorporated herein by reference in their entirety for all purposes: U.S. Provisional Patent Application No. 62/932,403, filed Nov. 7, 2019, and entitled "Method of Steam Methane Reforming in the Presence of Molten Sorbents"; U.S. Provisional Patent Application No. 63/005,603, filed Apr. 6, 2020, and entitled "Sorbent-Enhanced Processes for the Reaction of Fuel to Produce Hydrogen and Related Systems"; and International Patent Application No. PCT/US2019/040961, filed Jul. 9, 2019, published as WO 2020/072115 on Apr. 9, 2020, and entitled "Carbon Dioxide Removal Using Sequestration Materials that Include Salts in Molten Form, and Related Systems and Methods."

The following examples are intended to illustrate certain embodiments of the present invention, but do not exemplify the full scope of the invention.

Example 1

The following example describes methods for driving the production of hydrogen from several industrial fuel sources.

The aim of hydrogen production through pre-combustion is to convert carbon-based fuels, such as natural gas, coal, and biomass, into carbon free hydrogen via synthesis gas (i.e., syngas, a mixture of $H_2$ and CO) with the inherent removal of $CO_2$. Hydrogen (e.g., hydrogen gas) may then be used as a clean energy source in gas turbines, internal combustion engines, or fuel cell vehicles. Also, in times of low electricity demand, a plant could produce storable and dispatchable hydrogen for use when required or in a poly-generation plant, produce other products such as ammonia and methanol from the dispatchable hydrogen.

The general reaction can be written as follows:

Carbon Based Fuel+Oxidising Agent→Mixture of gaseous fuels     (1)

where, the oxidizing agent is typically steam or oxygen and the composition of the gaseous fuel (e.g., syngas) is related to the carbon-based fuel being used. The mixture of gaseous fuels can have a variety of hydrogen to carbon ratios. Some examples are shown in Table 1.

TABLE 1

Various means of producing hydrogen from carbon-based fuels

| | Solid or Liquid (typically coal) | Gaseous (typically natural gas) Reforming | | |
|---|---|---|---|---|
| Fuel Type Oxidizing Agent | Gasification $O_2$ Gasification | $H_2O$ Steam Methane Reforming (SMR) | $O_2$ Partial Oxidation (PO) | $H_2O$ & $O_2$ Auto Thermal Reforming (ATR) |
| $H_2$:CO ratio | ~½ to ~1 | 4 | 3 | 2 to 3 |

For example, hydrogen can be produced via the Steam Methane Reforming (SMR) reaction, $$CH_4 + H_2O \leftrightarrow 3H_2 + CO$$

The Water Gas Shift Reaction (WGSR) follows the production of syngas. These approaches are similar in this regard. With the appropriate addition of $H_2O$ the exothermic WGSR produces $CO_2$ and more $H_2$, $$CO + H_2O \leftrightarrow H_2 + CO_2$$

such that overall for methane, $$CH_4 + 2H_2O \leftrightarrow 4H_2 + CO_2.$$

Figure 4A:
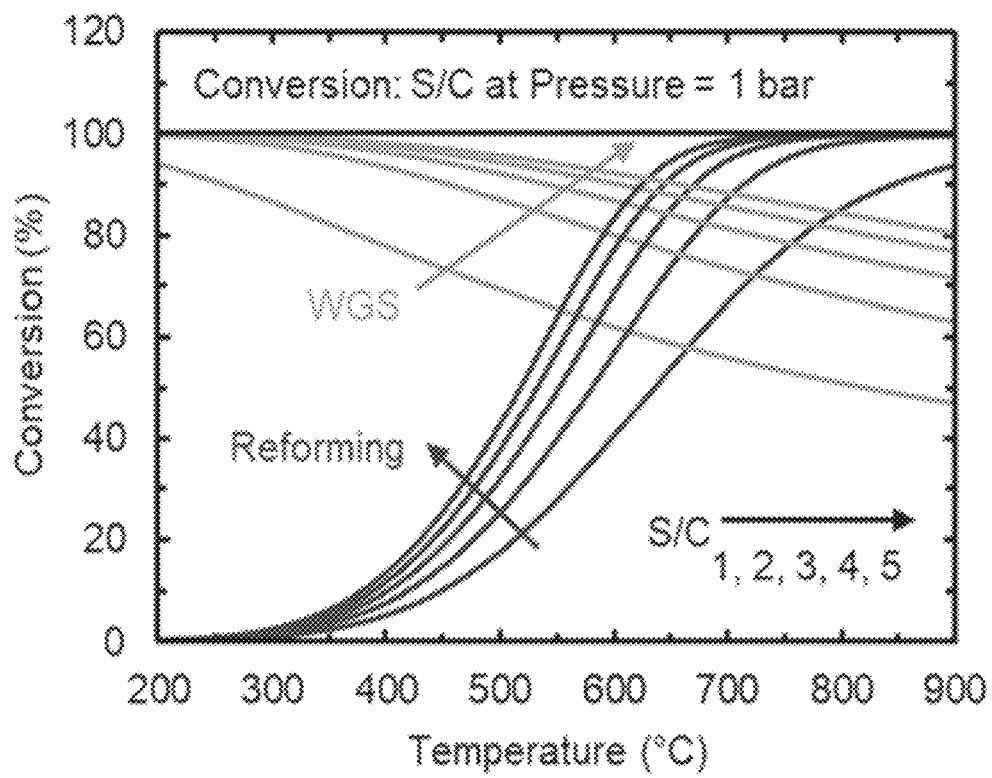
FIG. 4A is a plot of equilibrium conversion for reforming and water gas shift reactions as a function of temperature with a particular steam to carbon (S/C) ratio at 1 bar, according to one set of embodiments.
Figure 4B:
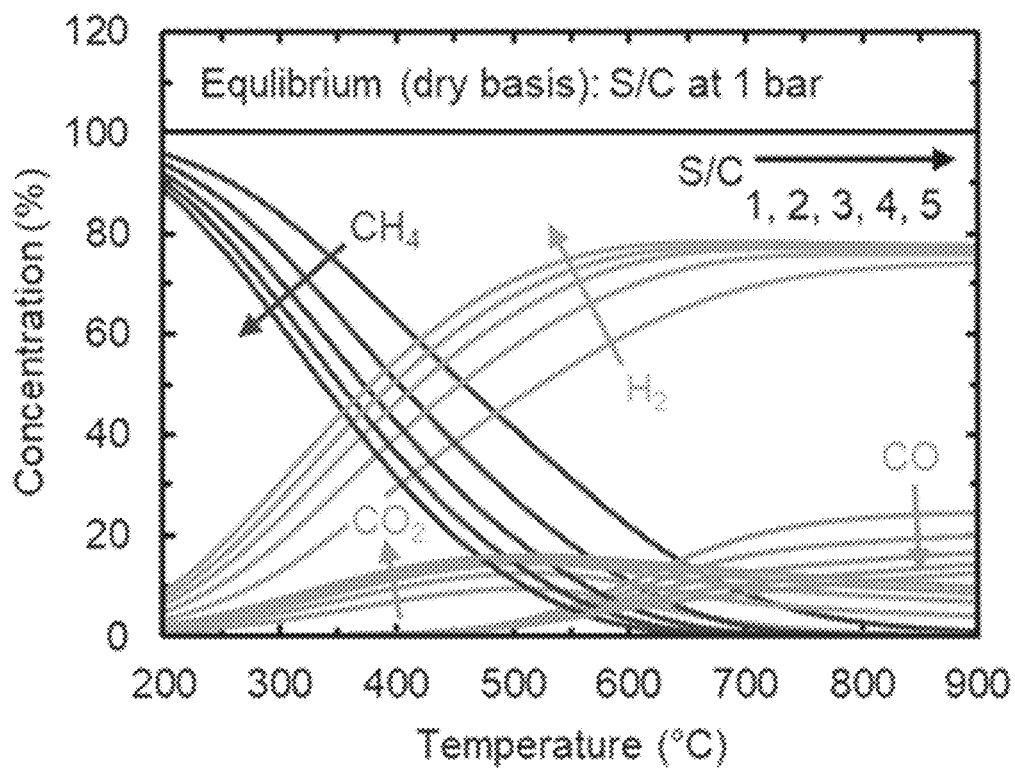
FIG. 4B is a plot of equilibrium concentrations for the overall reaction with methane as a fuel as a function of temperature and a particular steam to carbon (S/C) ratio at 1 bar, according to one set of embodiments.

Equilibrium conversion for the steam methane reforming and WGS reactions as a function of temperature are shown in FIG. 4A. The ratio of steam-to-carbon (S/C) represents a balance between improved conversion and decreased capital costs through smaller equipment. Here operation at atmospheric pressure is considered but a similar balance is found with higher pressures minimizing equipment size while limiting conversion. Equilibrium concentrations for the overall reaction as a function of temperature are shown in FIG. 4B.

Process Schemes

The opportunity to reduce emissions and separate $CO_2$ from the hydrogen product occurs at multiple points in the process. Three processes are summarized in FIGS. 5A-5C for reforming (e.g., methane is a fuel) and two processes in FIGS. 6A-6B for gasification (e.g., coal is a fuel).

Figure 5A:
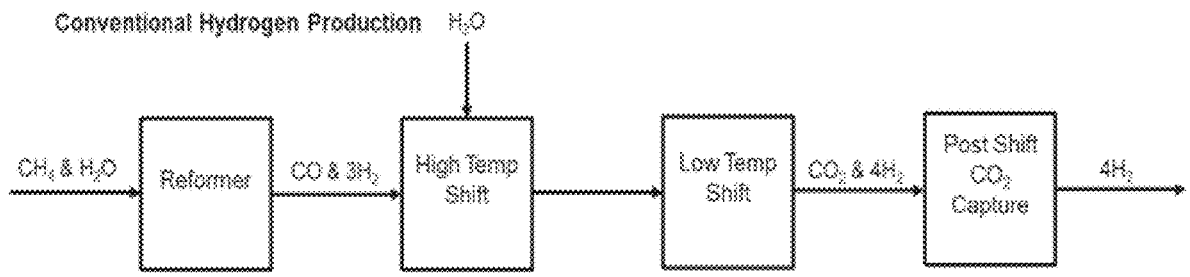
FIG. 5A is a schematic block diagram for reforming with post shift capture, according to a conventional method.
Figure 5B:
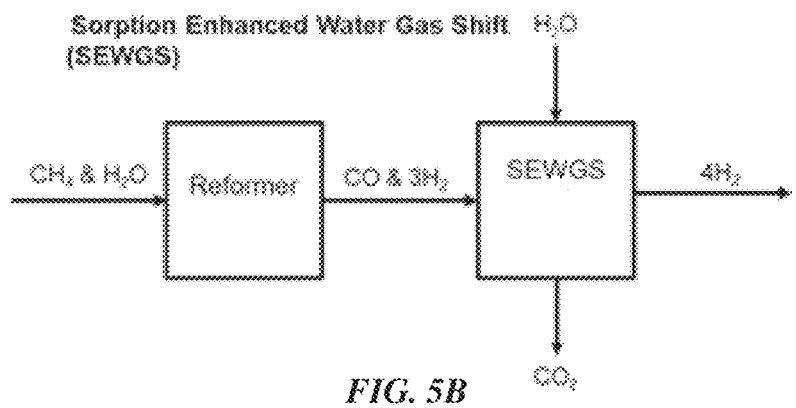
FIG. 5B is a schematic block diagram for reforming with Sorption Enhanced Water Gas Shift (SEWGS), according to some embodiments.
Figure 5C:
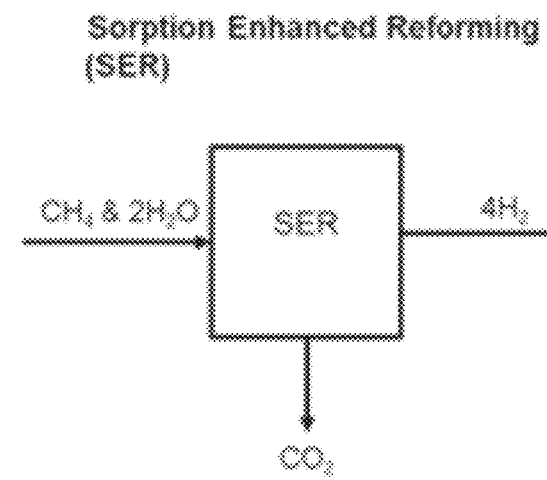
FIG. 5C is a schematic block diagram for reforming with Sorption Enhanced Reforming (SER), according to some embodiments.

The processes summarized in FIGS. 5A-5C can be performed at a variety of temperatures, as described above and elsewhere herein. For example, referring to FIG. 5A, in some embodiments, the reformer can be operated at a temperature of about 850° C., the high temperature shift reaction can be operated at a temperature of about 350° C., the low temperature shift reaction can be operated at a temperature of about 250° C., and the post shift $CO_2$ capture can be operated at a temperature of about 50° C. Referring to FIG. 5B, in some embodiments, the reformer can be operated at a temperature of about 850° C. and the SEWGS reaction can be operated at a temperature of about 300° C. to about 350° C. Referring to FIG. 5C, in some embodiments, the SER reaction can be operated at a temperature of about 700° C.

Figure 6A:
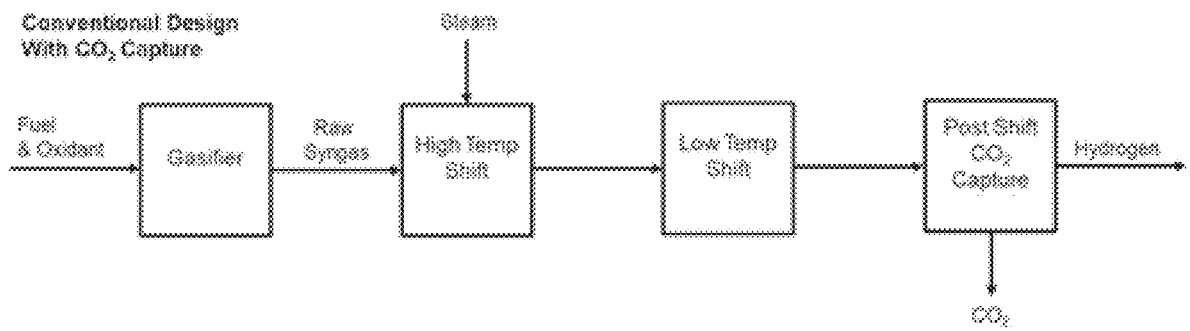
FIG. 6A is a schematic block diagram for gasification with post-shift capture, according to a conventional method.
Figure 6B:
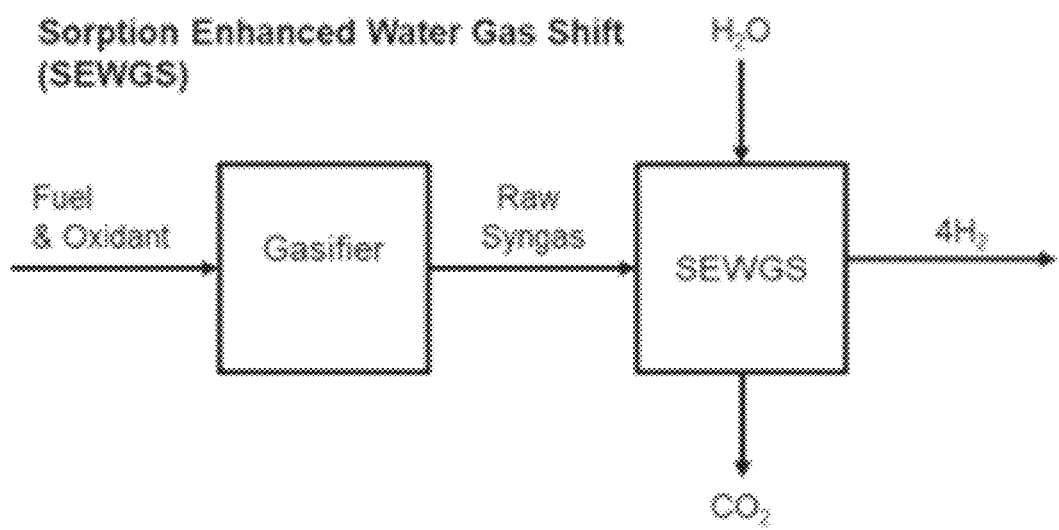
FIG. 6B is a schematic block diagram for gasification with Sorption Enhanced Water Gas Shift (SEWGS), according to some embodiments.

The processes summarized in FIGS. 6A-6B can also be performed at a variety of temperatures, as described above and elsewhere herein. For example, referring to FIG. 6A, in some embodiments, the gasifier can be operated at a temperature of about 1000° C., the high temperature shift can be operated at a temperature of about 350°, the low temperature shift can be operated at a temperature of about 250° C., and/or the post shift $CO_2$ capture can be operated at a temperature of about 50° C. Referring to FIG. 6B, in some embodiments, the gasifier can be operated at a temperature of about 1000° C.

Applying carbon capture to the conventional process, as shown in FIG. 5A and FIG. 6A, generally requires that $CO_2$ be removed after the WGS reaction by methods similar those used in post-combustion carbon capture, for example amines or certain physical solvents that comprise dimethyl ethers of polyethylene glycol (DEPG).

Without wishing to be bound by any theory, Sorption Enhanced Water Gas Shift (SEWGS) exploits Le Chatelier's principle to pull the WGS reaction to completion by removing $CO_2$ as it forms. A block diagram for SEWGS is shown in FIG. 5B and FIG. 5B with $CO_2$ separation during the WGS reaction the low temperature shift reactor is made obsolete. For the case of reforming the process can be reduced further to a one-step Sorption Enhanced Reforming (SER) operation as shown in FIG. 5C. Here, the removal of $CO_2$ as it forms pulls the WGS reaction to completion. In doing so carbon monoxide is consumed, which then shifts the reforming reaction to completion. Both SEWGS and SER require materials capable of capturing $CO_2$ at high temperatures, but, in some cases, SER requires a catalyst.

Figure 7A:
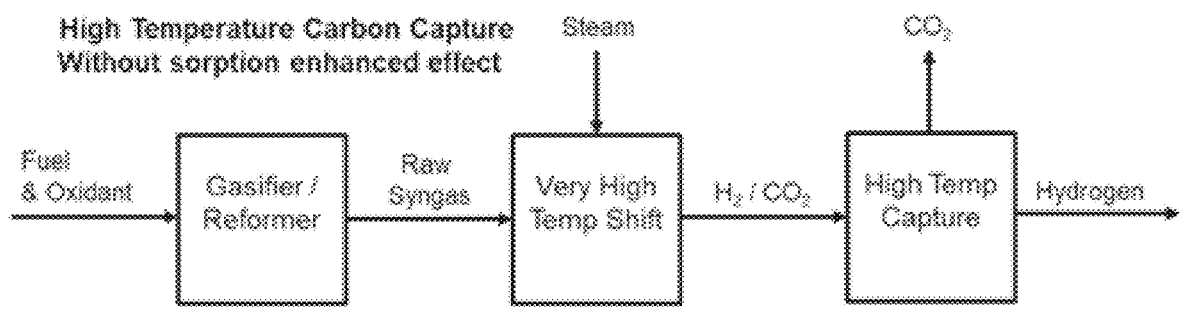
FIG. 7A is a schematic block diagram for a reforming/gasification process with a high water gas shift reactor and a separate high temperature capture, according to some embodiments.
Figure 7B:
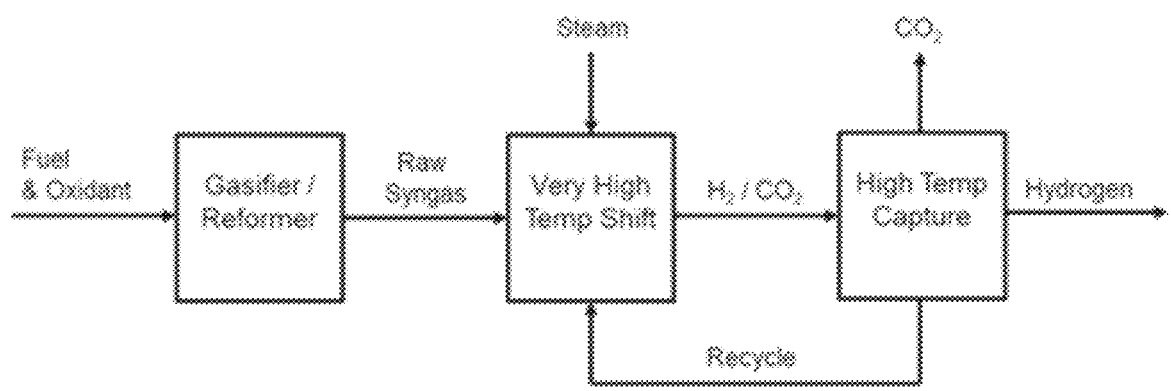
FIG. 7B is a schematic block diagram for a reforming/gasification process with a high water gas shift reactor and a separate high temperature capture with a recycle stream to maintain high conversion, according to some embodiments.

Other designs can also incorporate the capture of $CO_2$ at high temperatures without taking advantage of the sorption enhancing effect, as schematically shown in FIGS. 7A-7B. These designs are similar to the processes shown in FIG. 5A and FIG. 6A but with the WGS reactor operating at a high temperature (e.g., about 600° C.). The temperatures of the other components of FIG. 7A (e.g., gasifier/reformer, high temperature capture) can also be at high temperatures (e.g., about 600° C.). Here the reforming/gasification reaction occurs in one environment, and the water gas shift reaction occurs in a second environment, and the $CO_2$ capture occurs in a third environment. This avoids challenges associated with integrating the sorbent into SEWGS & SER processes. FIG. 7A shows this process, but since one modest conversion of the WGSR is achieved at ~600° C. a recycle stream, as shown in FIG. 7B, may be incorporated into the process.

Incorporating Molten Sorbents

The liquid nature of the molten sorbents makes them resistant to the morphological degradation that holds back solid oxides. Without wishing to be bound by any theory, the molten alkali metal borates can display rapid kinetics, high working capacities, the ability to capture multiple acid gases, and allow for new and innovative methods for regeneration. However, their reactivity and fluidic nature bring about other challenges including material compatibility and the need to maintain a gas-solid interface between the reactants and the catalyst whilst simultaneously maintaining a gas-liquid interface between the reaction products and the molten sorbent.

Incorporating the sorbents into the sorption enhanced reforming reactor requires compatibility between the sorbent and the catalyst. The catalyst is typically a transition metal supported on a metal oxide support, commercially nickel on an alumna ($Al_2O_3$) is used but other transition metals such as platinum may also be used. Numerous other metal oxide supports are also widely considered.

A concern with the molten sorbents is their reactivity towards numerous elements and compounds. In terms of transition metals, nickel and platinum are some non-limiting candidates. Other non-limiting examples of metal oxide supports include magnesia (MgO), cerium oxide ($CeO_2$), tin oxide ($SnO_2$), yttrium oxide ($Y_2O_3$), zirconium dioxide ($ZrO_2$), yttrium-stabilized-zirconia (YSZ), but others may exist.

A second challenge, as discussed above, is the need to maintain a gas-solid interface between the reactants and the catalyst whilst simultaneously maintaining a gas-liquid interface between the reaction products and the molten sorbent, in certain cases. This may be overcome, as described here and elsewhere herein, by physically separating the sorbent and catalyst in the reactor, or by incorporating the catalyst into the sorbent in some way that maintains catalytic activity and the sorbents capacity for $CO_2$.

In the case of SEWGS a catalyst may not be necessary, avoiding the key challenge of SER. Operation at a higher temperature (e.g. 600° C.) reduces conversion of the WGSR, FIG. 5A, but the ability to pull the reaction to completion is expected to overcome this. In the case of high water gas shift with high temperature carbon capture, as schematically shown in FIGS. 7A-7B, is a relatively straightforward process that may not rely on any sorption-enhancing effect.

Example 2

The following example describes reactor designs incorporating catalysts that are physically separated from the sorbent.

One challenge of the Sorption Enhanced Reforming (SER) design is the deactivation of the catalyst in the presence of the molten sorbent. One method to avoid catalyst deactivation is to physically separate the catalyst and the molten sorbent.

Figure 8:
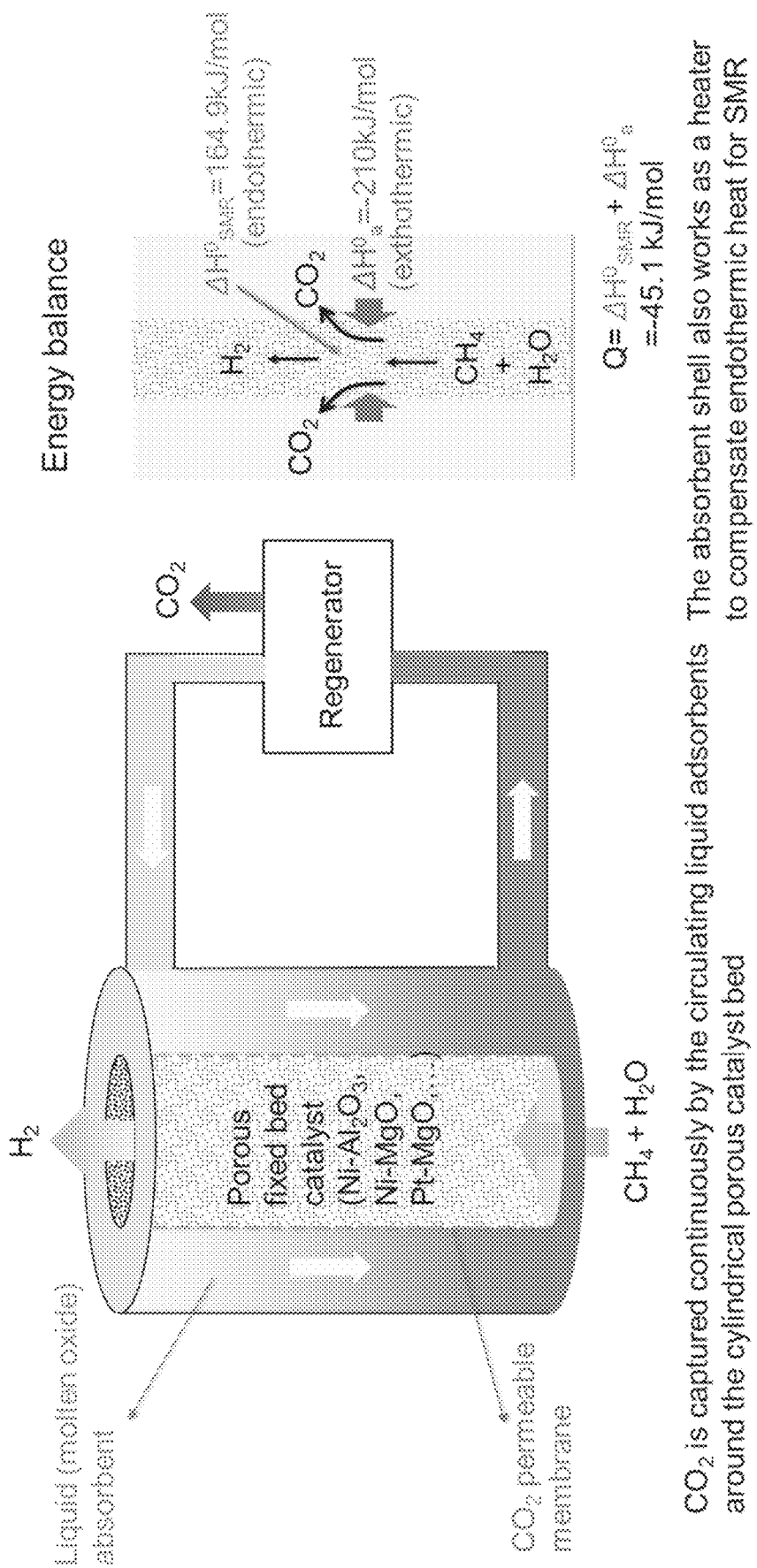
FIG. 8 is a schematic design of a reactor design for molten oxide-based continuous SE-SMR, according to one set of embodiments.

In FIG. 8, the gaseous fuel and steam can be fed into an inner tube which is packed with the steam methane reforming catalyst (e.g., Ni—$Al_2O_3$). Meanwhile, the molten sorbent can be fed into an outer tube. Inner and outer environments can be separated by a separator, which may allow the contact of molten sorbent on the exterior with gas on the interior. The contact between gas and molten sorbent would capture $CO_2$ and, along the reactor, provide the sorption enhanced effect (e.g., driving the reaction to produce more hydrogen gas by capturing $CO_2$). The molten sorbent may be cycled with a regeneration step to recover the captured $CO_2$. Without wishing to be bound by any theory, the energy balance on the left indicates that this reaction may be exothermic, helping to maintain the high temperatures of operation.

Figure 9:
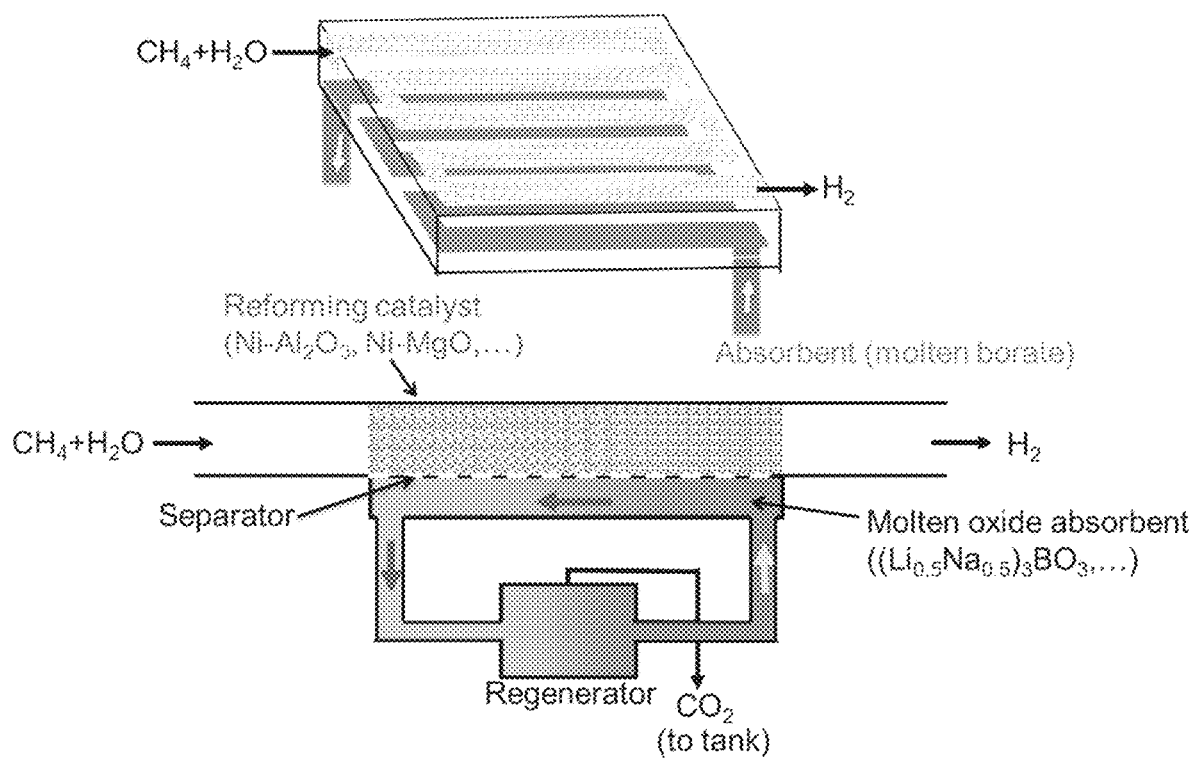
FIG. 9 is another schematic design of a reactor design for molten oxide-based continuous SE-SMR, according to one set of embodiments.

FIG. 9 presents a horizontal variation but is otherwise similar to FIG. 8. Other arrangements of flow directions are possible. For example, the inner tube could contain molten sorbent and the outer catalyst. The emphasis is on physical separation to avoid catalyst deactivation. It is contemplated that this design could also be applied to the Sorption Enhanced Water Gas Shift (SEWGS) concept, described elsewhere herein.

Example 3

The following example describes the sorption-enhanced water gas shift (SEWGS) process using molten sorbents.

Figure 10:
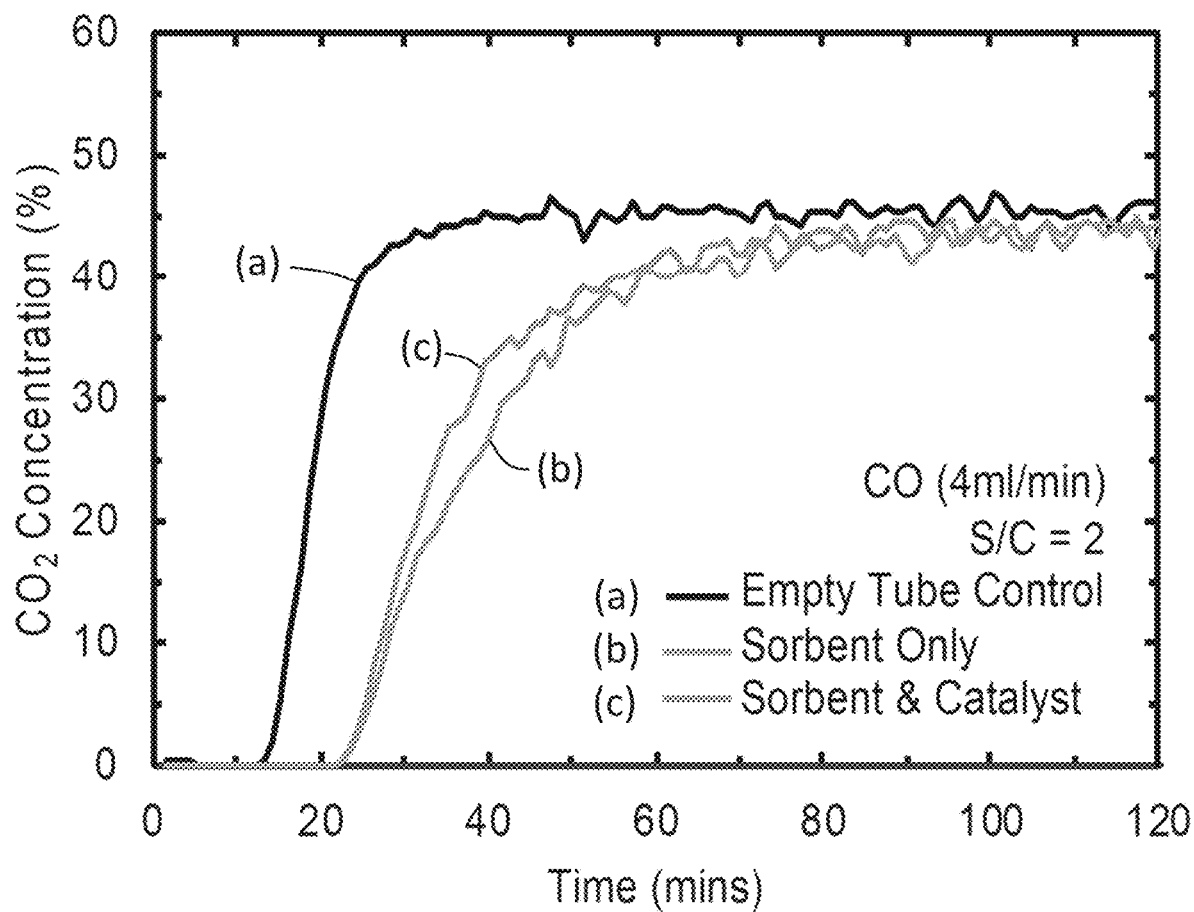
FIG. 10 is a plot showing the concentration of $CO_2$ as a function of time of an empty tube control, a tube loaded with sorbent, and a tube loaded with sorbent and a catalyst, according to one set of embodiments.

A control experiment was performed in which carbon monoxide and steam were injected into an empty tube maintained at 600° C. The carbon monoxide flow rate was 4 ml/min and the steam injection rate was selected such that the steam-to-carbon ratio (S/C) was equal to two. A reaction occurred inside the tube converting the carbon monoxide and steam into carbon dioxide and hydrogen. FIG. 10 shows the carbon dioxide concentration at the outlet over time. The approximate 15-minute delay corresponds to the bed volume of the system. Beyond this delay a stable $CO_2$ concentration of around 45% was achieved.

Two additional experiments were conducted in which sorbent was present. The sorbent used in these experiments was sodium borate $Na_xB_{1-x}O_{1.5-x}$ where x=0.75. This sorbent was a liquid at 600° C. In the cases with the sorbent, a similar conversion to $CO_2$ was observed. However, a slightly longer delay was observed. The difference between the empty tube control and the sorbent only experiment can be attributed to the capture of $CO_2$ by the sorbent. The case with a mixture of sorbent and nickel catalyst, also shown in FIG. 10, resulted in a very similar breakthrough profile. This suggests that the nickel catalyst played no significant role in improving the capture of $CO_2$. The sorbent's capacity was estimated from the area between the control and sorbent/ mixture curves. The results were 0.61 mmol of $CO_2$ per gram of sorbent (mmol/g) and 0.52 mmol/g for the sorbent only and sorbent-catalyst mixture cases, respectively.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/ or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
   a reactor configured to react carbon monoxide (CO) in a water-gas shift reaction (WGSR) that generates (i) hydrogen and (ii) carbon dioxide ($CO_2$), and
   a separator in fluid communication with said reactor, wherein said separator comprises a molten sorbent comprising a salt in molten form, wherein said molten sorbent is configured to capture at least a portion of said $CO_2$, thereby obtaining captured $CO_2$.

2. The system of claim 1, wherein said CO is produced by reacting a fuel and steam.

3. The system of claim 2, wherein said fuel comprises methane.

4. The system of claim 2, wherein said fuel comprises a hydrocarbon of the form $C_nH_{2n+2}$, where n is an integer number.

5. The system of claim 1, wherein said reactor further comprises a catalyst.

6. The system of claim 1, wherein said separator comprises a $CO_2$ permeable membrane.

7. The system of claim 1, further comprising a desorber in fluid communication with said separator, wherein said desorber is configured to release at least a portion of said captured $CO_2$ from said molten sorbent.

8. The system of claim 1, wherein said salt in molten form comprises boron and oxygen.

9. The system of claim 1, wherein said salt in molten form comprises an alkali metal borate, $A_xB_{1-x}O_{1.5-x}$, where A is an alkali metal, B is Boron, O is Oxygen, and x is a number such that $0<x<1$.

10. The system of claim 1, wherein said reactor and said separator are located in a single vessel.

11. A method, comprising:
    directing carbon monoxide (CO) into a reactor;
    in said reactor, reacting said CO in a water gas shift reaction (WGSR) that generates (i) hydrogen and (ii) carbon dioxide ($CO_2$); and
    directing a stream comprising said $CO_2$ from said reactor to a separator in fluid communication with said reactor, wherein said separator comprises a molten sorbent comprising a salt in molten form that captures at least a portion of said $CO_2$, thereby obtaining captured $CO_2$.

12. The method of claim 11, wherein said CO is produced by reacting a fuel and steam.

13. The method of claim 12, wherein said fuel comprises methane.

14. The method of claim 12, wherein said fuel comprises a hydrocarbon of the form $C_nH_{2n+2}$, where n is an integer number.

15. The method of claim 11, wherein said reactor further comprises a catalyst.

16. The method of claim 11, wherein said separator comprises a $CO_2$ permeable membrane.

17. The method of claim 11, further comprising directing said captured $CO_2$ to a desorber, and in said desorber, releasing at least a portion of said captured $CO_2$ from said molten sorbent.

18. The method of claim 11, wherein said salt in molten form comprises boron and oxygen.

19. The method of claim 11, wherein said salt in molten form comprises an alkali metal borate, $A_xB_{1-x}O_{1.5-x}$, where A is an alkali metal, B is Boron, O is Oxygen, and x is a number such that $0<x<1$.

20. The method of claim 11, wherein said reactor and said separator are located in a single vessel.

* * * * *